(12) United States Patent
Tago et al.

(10) Patent No.: US 8,190,632 B2
(45) Date of Patent: May 29, 2012

(54) COMPUTER PRODUCT, INFORMATION RETRIEVING APPARATUS, AND INFORMATION RETRIEVING METHOD

(75) Inventors: Shinichiro Tago, Kawasaki (JP); Seishi Okamoto, Kawasaki (JP); Hiroya Inakoshi, Kawasaki (JP); Tatsuya Asai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 12/559,836

(22) Filed: Sep. 15, 2009

(65) Prior Publication Data
US 2010/0005058 A1 Jan. 7, 2010

Related U.S. Application Data

(63) Continuation of application No. PCT/JP2007/056434, filed on Mar. 27, 2007.

(51) Int. Cl.
*G06F 17/30* (2006.01)

(52) U.S. Cl. .................... 707/770; 715/205; 715/225

(58) Field of Classification Search .......... 707/770, 707/769, 781, 783, 778; 715/205, 207, 225, 715/227, 230, 231, 234, 239
See application file for complete search history.

(56) References Cited

U.S. PATENT DOCUMENTS

| | | | | |
|---|---|---|---|---|
| 6,889,223 B2* | 5/2005 | Hattori et al. | ......... | 1/1 |
| 7,080,067 B2* | 7/2006 | Nonomura et al. | ......... | 1/1 |
| 7,120,861 B1* | 10/2006 | Marukawa | ......... | 715/210 |
| 7,143,349 B2* | 11/2006 | Marukawa | ......... | 715/255 |
| 7,231,386 B2* | 6/2007 | Nonomura et al. | ......... | 1/1 |
| 7,293,018 B2* | 11/2007 | Hattori et al. | ......... | 1/1 |
| 2002/0143742 A1* | 10/2002 | Nonomura et al. | ......... | 707/1 |
| 2002/0147711 A1* | 10/2002 | Hattori et al. | ......... | 707/3 |
| 2005/0060306 A1* | 3/2005 | Hattori et al. | ......... | 707/3 |
| 2005/0114763 A1* | 5/2005 | Nonomura et al. | ......... | 715/513 |
| 2005/0203900 A1* | 9/2005 | Nakamura et al. | ......... | 707/5 |
| 2005/0257140 A1* | 11/2005 | Marukawa | ......... | 715/513 |
| 2006/0206464 A1* | 9/2006 | Marukawa | ......... | 707/3 |

FOREIGN PATENT DOCUMENTS

JP 2000-90091 3/2000
(Continued)

OTHER PUBLICATIONS

International Preliminary Report on Patentability issued Sep. 29, 2009 in corresponding International Patent Application PCT/JP2007/056434.

(Continued)

*Primary Examiner* — Jean M Corrielus
(74) *Attorney, Agent, or Firm* — Staas & Halsey LLP

(57) ABSTRACT

A computer-readable recording medium stores therein an information retrieving program that causes a computer to execute acquiring a document to be searched and having a hierarchical structure; generating a path schema related to the acquired document; receiving input of a retrieval keyword, a retrieval condition for the retrieval keyword, and a retrieval equation specifying a retrieval range for the retrieval keyword; generating a single automaton that includes a hierarchy retrieval automaton that retrieves a hierarchy of the generated path schema and a hit keyword retrieval automaton that retrieves a hit keyword satisfying the retrieval condition, the single automaton making state transition between a hit hierarchical node where the hit keyword in the hierarchy retrieval automaton is present and a set of nodes representing the hit keyword; retrieving, from the document and using the single automaton, the hit keyword within the retrieval range; and outputting a retrieval result.

19 Claims, 36 Drawing Sheets

FOREIGN PATENT DOCUMENTS

| | | |
|---|---|---|
| JP | 2005-70911 | 3/2005 |
| JP | 2006-189951 | 7/2006 |

OTHER PUBLICATIONS

International Preliminary Report on Patentability, mailed Oct. 29, 2009, in corresponding International Application No. PCT/JP2007/056434 (5 pp.).

Ishino, A. et al., *A Proposal for XQuery Processor with Deterministic Automaton and Path Pruning*, DBSJ Letters, vol. 4, No. 4, pp. 17-20 with English Abstract.

International Search Report, mailed May 1, 2007, in corresponding International Application No. PCT/JP2007/056434.

Form PCT/ISA/237, mailed May 1, 2007, in corresponding International Application No. PCT/JP2007/056434.

Akira Ishino et al., "Stream-oriented XQuery Processor Using Path Pruning and Deterministic Automation", Symposium of the Information Processing Society of Japan (DBWeb2005), Nov. 21, 2005, vol. 2005, No. 16, pp. 33-40.

Japanese Office Action mailed Nov. 22, 2011 issued in corresponding Japanese Patent Application No. 2009-506167.

* cited by examiner

```
<syain>
<ACT>     シグマ戦隊
<chara>
<name>    シグマレッド    </name>
</chara>
<chara>
<name>    シグマブルー    </name>
</chara>
</ACT></syain>
```

| PECULIAR NUMBER | HIERARCHICAL NAME |
|---|---|
| 1 | syain |
| 2 | ACT |
| 3 | chara |
| 4 | nick |
| 5 | cast |
| 6 | name |
| 7 | ID |

```
<syain>
<ACT>  シグマ戦隊
<chara>
<nick>
<name> レッド    </name>
</nick> </chara>
<chara>
<name> シグマレッド
<ID> 006 </ID>
</name> </chara>
<cast>
<name> 特許太郎    </name>
</cast>
<chara>
<nick>
<name> ブルー    </name>
</nick> </chara>
<name> シグマブルー
<ID> 007 </ID>
</name> </chara>
<cast>
<name> 実用花子    </name>
</cast>
</ACT></syain>
```

FIG.31

| PATH ID | PATH |
|---|---|
| 0 | / |
| 1 | /Syain |
| 2 | /Syain/ACT |
| 3 | /Syain/ACT/chara |
| 4 | /Syain/ACT/chara/name |
| 5 | /Syain/ACT/chara/nick |
| 6 | /Syain/ACT/chara/nick/name |
| 7 | /Syain/ACT/chara/name/ID |
| 8 | /Syain/ACT/cast |
| 9 | /Syain/ACT/cast/name |

FIG.32

3201
```
<syain>
<ACT> シグマ戦隊
<name> シグマレッド </name>
<nick>
<name> レッド </name>
</nick>
</chara>
<chara>
<name> シグマブルー
<ID> 007 </ID>
</name> </chara>
<cast>
<name> 実用花子 </name>
</cast>
</ACT> </syain>
```

3202
```
[1
[2 シグマ戦隊
[3
[4 シグマレッド /4
[5
[6 レッド /6
/5
/3
[3
[4 シグマブルー
[7 007 /7
/4 /3
[8
[9 実用花子 /9
/8
/2 /1
```

FIG.34
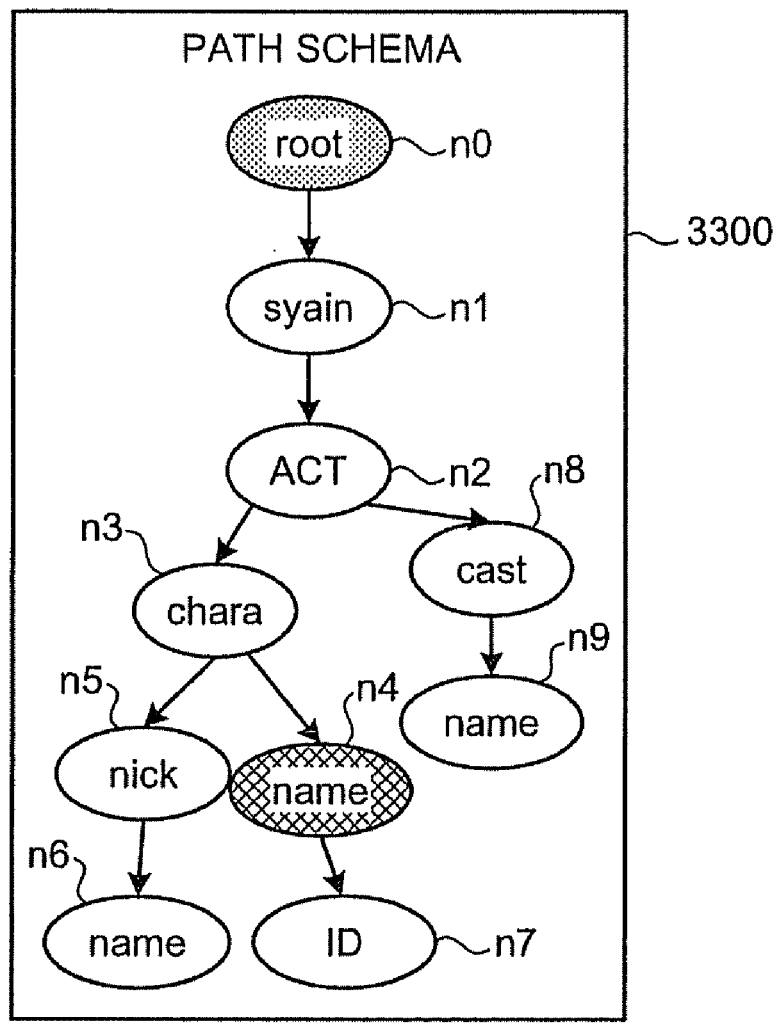
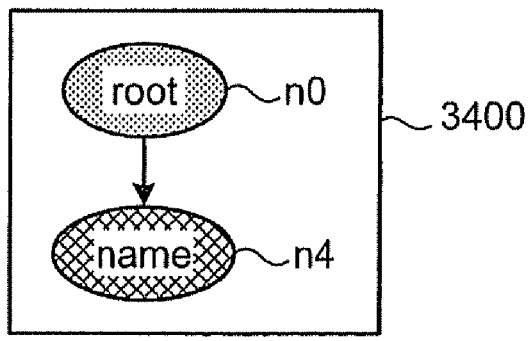

RETRIEVAL EQUATION K1: /syain/ACT/chara//
RETRIEVAL EQUATION K2: //name
⇒Q1: [3 or [4 or [5 or [6 or [7  ⇒Q1: [3 or [5 or [7
 Q2: [4 or [6 or [9     Q2: [9
              Q2&Q1: [4 or [6

COMPUTER PRODUCT, INFORMATION RETRIEVING APPARATUS, AND INFORMATION RETRIEVING METHOD

CROSS-REFERENCE TO RELATED APPLICATIONS

This is a continuation of International Application PCT/JP2007/056434, filed on Mar. 27, 2007, the entire contents of which are hereby incorporated by reference.

FIELD

The embodiments discussed herein are related to information retrieval with respect to electronic documents.

BACKGROUND

The volume of information in various fields has explosively increased in recent years. In some fields, the size of data is growing from the order of gigabytes to the order of terabytes, making extraction of desired data from such an enormous volume of data difficult. Data is typically saved having a hierarchical structure for easy management.

For example, to manage books in a library, hierarchies such as titles, authors, publishers, dates of publish, and lending information are used, enabling extraction of management information concerning a given book.

When desired data is extracted at high speed from an electronic document consisting of enormous amount of data and having a hierarchical structure, hierarchical retrieval and keyword retrieval are conventionally performed using separate automatons (see, e.g., Japanese Patent Application Laid-Open Publication No. 2005-070911).

For example, when a hierarchy retrieval automaton hits a hierarchical condition, a keyword retrieval automaton executes keyword retrieval. If, on the other hand, a symbol representing a hierarchy appears during execution of the keyword retrieval, the hierarchical retrieval automaton executes retrieval with respect to the hierarchical condition. These processes are carried out repeatedly.

According to the above technique, however, when an electronic document inclusive of frequently appearing symbols representing hierarchies, such as an XML document, is searched, switchover between a retrieving process using the hierarchy retrieval automaton and a retrieving process using the keyword retrieval automaton becomes highly frequent, which generates overhead, posing a problem of a drop in overall retrieval speed.

When retrieval equations for specifying a retrieval range are given to carry out simultaneous information retrieval, all retrieval equations are generated in one automaton. Consequently, when hit is made on a keyword, whether the current hierarchy satisfies a hierarchical condition corresponding to the hit keyword has to be determined. This brings about a problem in that retrieval speed drops when a keyword is hit at a high frequency.

SUMMARY

According to an aspect of an embodiment, a computer-readable recording medium stores therein an information retrieving program that causes a computer to execute acquiring a document to be searched and having a hierarchical structure; generating a path schema related to the acquired document; receiving input of a retrieval keyword, a retrieval condition for the retrieval keyword, and a retrieval equation specifying a retrieval range for the retrieval keyword; generating a single automaton that includes a hierarchy retrieval automaton that retrieves a hierarchy of the generated path schema and a hit keyword retrieval automaton that retrieves a hit keyword satisfying the retrieval condition, the single automaton making state transition between a hit hierarchical node where the hit keyword in the hierarchy retrieval automaton is present and a set of nodes representing the hit keyword; retrieving, from the document and using the single automaton, the hit keyword within the retrieval range; and outputting a retrieval result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram of an example of an electronic document to be searched according to a second embodiment;

FIG. 31 is an explanatory diagram of a path ID table 3100;

FIG. 32 is an explanatory diagram of a first example of conversion into a path ID;

FIG. 34 is an explanatory diagram of a sixth example of extraction of a partial path schema;

DESCRIPTION OF EMBODIMENTS

Preferred embodiments will be explained with reference to the accompanying drawings.

Figure 1:
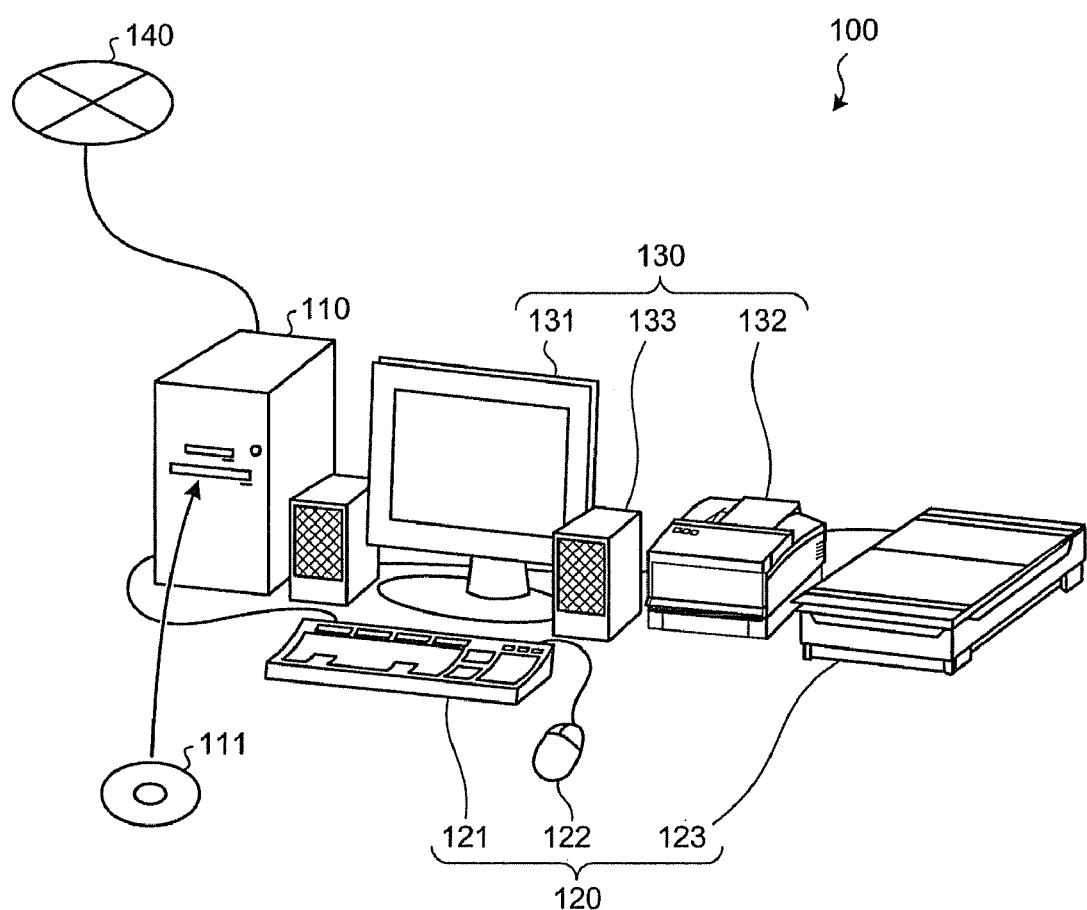
FIG. 1 is a block diagram of an information retrieving apparatus according to a first embodiment.

FIG. 1 is a block diagram of an information retrieving apparatus according to a first embodiment.

As depicted in FIG. 1, an information retrieving apparatus 100 includes a computer 110, an input device 120, and an output device 130, and may be connected with a network 140, e.g., a local area network (LAN), a wide area network (WAN), or the Internet through a non-depicted router or a modem.

The computer 110 has a central processing unit (CPU), a memory, and an interface. The CPU governs overall control of the information retrieving apparatus 100. The memory is constituted by, for example, read memory (ROM), a random access memory (RAM), a hard disk (HD), an optical disk 111, a flash memory, etc. The memory is used as a work area of the CPU.

Various programs are stored in the memory and loaded in response to a command from the CPU. The reading and the writing of data with respect to the HD and the optical disk 111 are controlled by a disk drive. The optical disk 111 and the flash memory are removable. The interface controls input from the input device 120, output to the output device 130, and transmission/reception with respect to the network 140.

As an input device 120, a keyboard 121, a mouse 122, and a scanner 123 are adopted. The keyboard 121 includes keys to input, for example, characters, numeric figures, and various kinds of instructions, and data is input through the keyboard 121. The keyboard 121 may be a touch panel. The mouse 122 is used to move a cursor, select a range, move a window, or change window size. The scanner 123 optically reads an image as image data, which is stored in the memory of the computer 110. The scanner 123 may have an optical character recognition (OCR) function.

As an output device 130, a display 131, a printer 132, a speaker 133, etc. are adopted. The display 131 displays a cursor, an icon, or a tool box as well as data, such as text, an image, and function information. The printer 132 prints image data or text data. The speaker 133 outputs sound, e.g., a sound effect or text-to-voice converted sound.

Figures 2, 3:
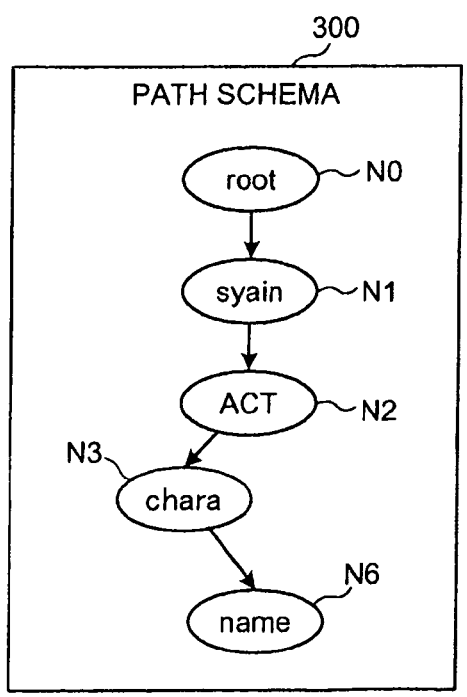
FIG. 2 is an explanatory diagram of an electronic document to be searched according to the first embodiment.
FIG. 3 is an explanatory diagram of a path schema of the first embodiment.

FIG. 2 is an explanatory diagram of an electronic document to be searched according to the first embodiment.

An XML document 200 is an electronic document having a hierarchical structure. The XML document 200 includes embedded tags, which express hierarchies. There are two types of tags, including start tags and end tags.

In the present specification, symbols making up a tag are referred to as tag symbols, among which "<" is referred to as a tag start symbol for a start tag, "</" is referred to as a tag start symbol for an end tag, and ">" is referred to as a tag end symbol for the start tag and the end tag. A character string located between a tag start symbol and a tag end symbol is referred to as a hierarchical name.

A path schema is a path tree made by extracting all paths originating from a root node present in the XML document 200 to be searched and integrating overlapping paths into a single path. Nodes in the path tree represent hierarchies in the XML document 200. Nodes in the path tree will hereinafter be referred to as hierarchical nodes.

FIG. 3 is an explanatory diagram of a path schema of the first embodiment. The path schema 300 depicted in FIG. 3 is the path schema related to the XML document 200 depicted in FIG. 2. As depicted in FIG. 3, a hierarchical node N0 is a root node, a hierarchical node N1 is a node representing "syain", a hierarchical node N2 is a node representing "ACT", a hierarchical node N3 is a node representing "chara", and a hierarchical node N6 is a node representing "name".

Figure 4:
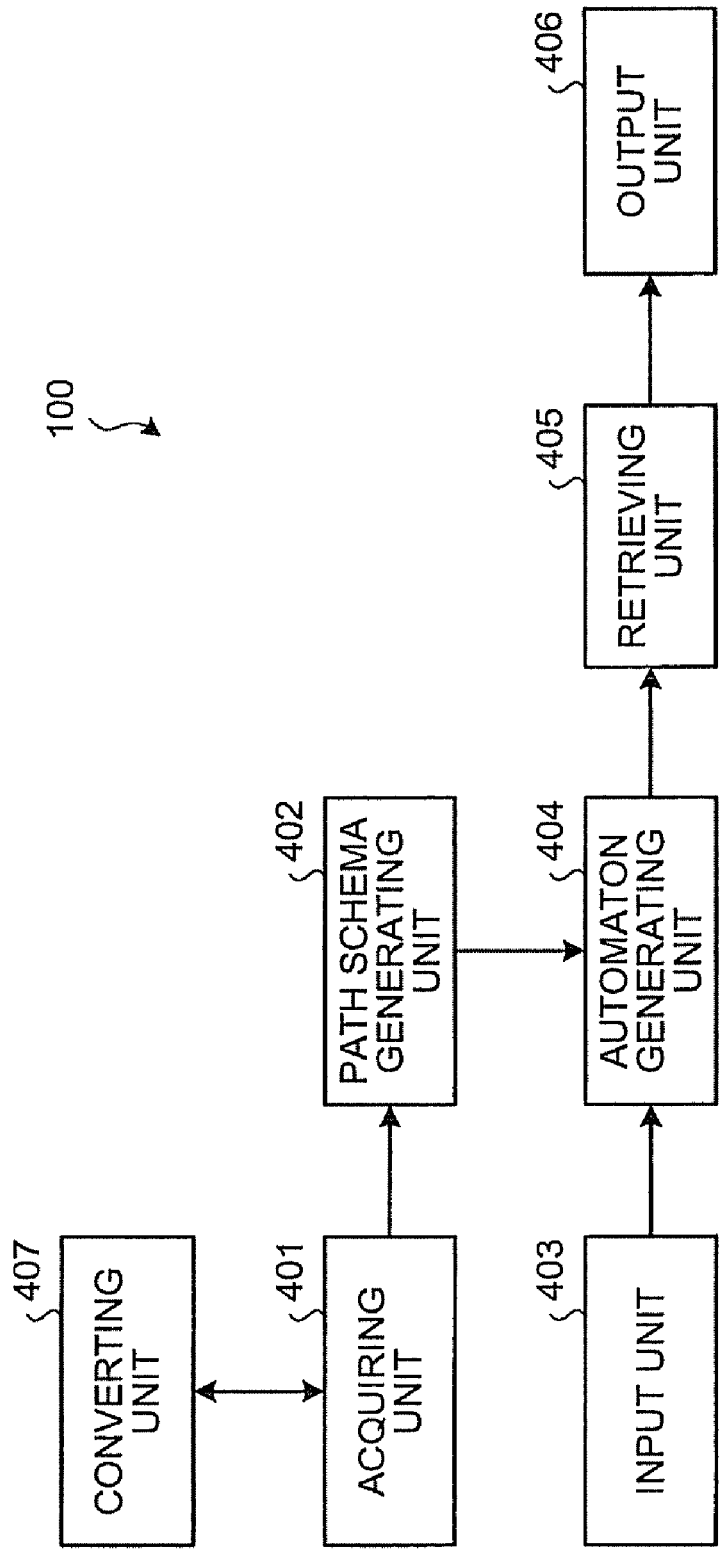
FIG. 4 is a block diagram of a functional configuration of the information retrieving apparatus depicted in FIG. 1.

FIG. 4 is a block diagram of a functional configuration of the information retrieving apparatus 100 depicted in FIG. 1. As depicted in FIG. 4, the information retrieving apparatus 100 includes an acquiring unit 401, a path schema generating unit 402, an input unit 403, an automaton generating unit 404, a retrieving unit 405, an output unit 406, and a converting unit 407.

Functions of these functional units 401 to 407 are implemented by causing a processor in the information retrieving apparatus 100 to execute a relevant program stored in the memory of the information retrieving apparatus 100 or through an input/output I/F.

Data output from each functional unit is saved to the memory. The function of a functional unit at a connection destination indicated by an arrow in FIG. 4 is implemented by reading from the memory, data output from a functional unit at the connection origin and causing the processor in the information retrieving apparatus 100 to execute a program relevant to the function.

The acquiring unit 401 has a function of acquiring an electronic document that is to be searched and has a hierarchical structure. For example, the acquiring unit 401 reads in the XML document 200 or takes in the XML document 200 through user operation of the keyboard 121.

The path schema generating unit 402 has a function of generating a path schema related to an electronic document acquired by the acquiring unit 401. For example, when the XML document 200 is acquired, the path schema generating unit 402 analyzes the structure of the XML document 200, using an XML parser. The XML parser is provided as, for example, DOM, SAX, or the XML scanner described in "Proposal of XQuery Processing Using Deterministic Finite Automaton by Path Pruning", written by Ishino, Akira and Takeda, Masayoshi; DBSJ Letters, Vol. 4, No. 4, pp. 17-20, 2006, http://www.dbsj.org/Japanese/DBSJLetters/vol4/no4/ishino.pdf. In this manner, a path schema such as that depicted in FIG. 3 is generated.

The input unit 403 has a function of receiving input of an arbitrary retrieval keyword, a retrieval condition for the retrieval keyword, and a retrieval equation. A retrieval keyword is a keyword that a user wants to retrieve from an electronic document, and is made up of a character string of characters and numerals.

A retrieval condition is a condition given to a retrieval keyword. For simple keyword retrieval, the retrieval condition is the condition of a full-matching search, forward-matching search, partial-matching search, reverse-matching search, similarity search, etc. For numerical value range retrieval, a numerical value range defined by an input numerical value (e.g., equal to, higher than, or lower than the numerical value) is equivalent to the retrieval condition.

A retrieval equation is a query equation that specifies a retrieval range for a retrieval keyword. The retrieval keyword is thus retrieved from the retrieval range in the electronic document. The retrieval range is specified by a path in a path schema. The retrieval range is expressed by the retrieval equation made by enumerating element names representing hierarchies via symbols "/".

The following is an example of a retrieval equation.

$$/\text{syain}/\text{ACT}/\text{chara}/\text{name}=\text{"ブルー"} \quad (1)$$

The left side of the retrieval equation (1) expresses the path that starts from the hierarchical node N0 to extend through the hierarchical node N1 representing "syain", the hierarchical node N2 representing "ACT", and the hierarchical node N3 representing "chara" to reach the hierarchical node N6 representing "name". The hierarchy of the hierarchical node N6 having a parent node of the hierarchical node N3 is equivalent to the retrieval range. The right side of the equation (1) expresses the retrieval keyword.

The retrieval keyword expressed at the right side is, therefore, retrieved from the retrieval range expressed at the left side. A hierarchical node in a retrieval range is referred to as "hit hierarchical node". With respect to retrieval equation (1), for example, the hierarchical node N6 having the parent node of the hierarchical node N3 is the hit hierarchical node. A keyword that satisfies a retrieval condition in a retrieval range to match or be associated with a retrieval keyword is referred to as "hit keyword". For retrieval equation (1), "ブルー" is equivalent to the hit keyword.

The automaton generating unit 404 has a function of generating a single automaton by connecting a hierarchy retrieval automaton to a keyword retrieval automaton. The hierarchy retrieval automaton is the automaton that executes retrieval with respect to hierarchies of the path schema 300, and includes hierarchical nodes making up the path schema 300 as constituent nodes. In other words, the hierarchy retrieval automaton is the automaton that determines to which hierarchical node in the path schema 300, a scanning position in the XML document 200 has transited to.

The keyword retrieval automaton is the automaton that executes retrieval of a hit keyword satisfying a retrieval condition. For example, the keyword retrieval automaton includes respective nodes of characters transited to in the order of the characters in the hit keyword. In other words, the keyword retrieval automaton is the automaton that determines to which node of a character in the hit keyword, a scanning position in the XML document 200 has transited to.

In the first embodiment, the hierarchy retrieval automaton and the keyword retrieval automaton are not treated as separate automatons, but as a singular automaton in which the hit hierarchical node is connected to the set of nodes of the hit keyword via a transition branch to execute state transition between a hit hierarchical node of the hierarchy retrieval automaton and a set of nodes of the hit keyword of the keyword retrieval automaton. As a result, the keyword retrieval automaton makes state transition when a scanning position in the XML document 200 has transited to the hit hierarchical node of the hierarchy retrieval automaton.

Figure 5:
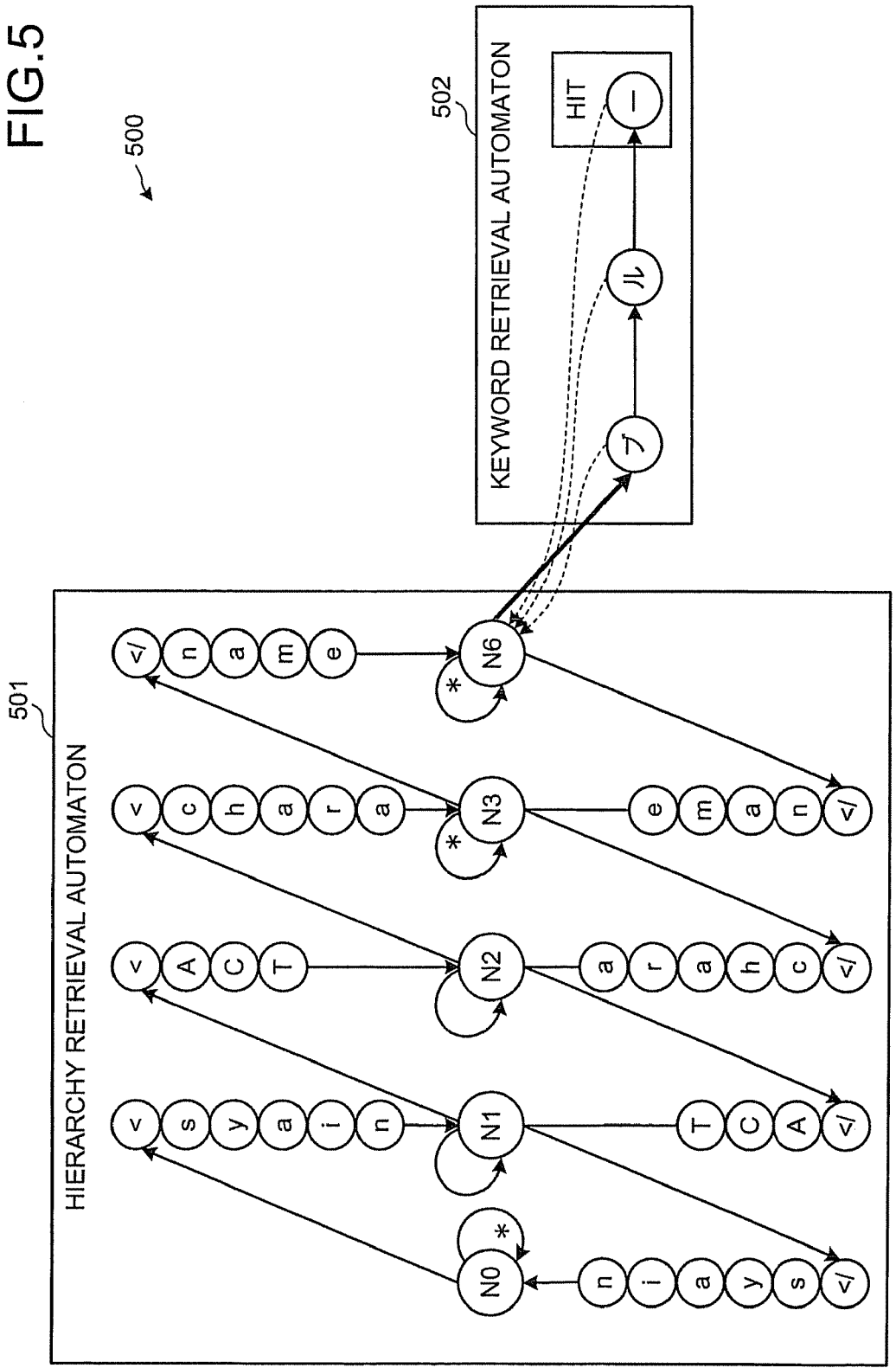
FIG. 5 is an explanatory diagram of a single automaton of the first embodiment.

FIG. 5 is an explanatory diagram of a single automaton of the first embodiment. A single automaton 500 is the automaton that results when retrieval equation (1) is given. As depicted in FIG. 5, the hierarchical node N0 represents an initial state. The upper half of a hierarchy retrieval automaton 501 represents state transition from superior hierarchical nodes to subordinate hierarchical nodes, while the lower half represents state transition from subordinate hierarchical nodes to superior hierarchical nodes.

State transition with respect to the upper half will first be described. The hierarchy retrieval automaton 501 has a node representing the tag start symbol "<" for the start tag between a superior hierarchical node as a transition origin and a subordinate hierarchical node as a transition destination for the superior hierarchical node.

For example, a node representing the tag start symbol "<" for the start tag is placed between the hierarchical node N0 and the hierarchical node N1 subordinate to the hierarchical node N0, between the hierarchical node N1 and the hierarchical node N2 subordinate to the hierarchical node N1, between the hierarchical node N2 and the hierarchical node N3 subordinate to the hierarchical node N2, and between the hierarchical node N3 and the hierarchical node N6 subordinate to the hierarchical node N3. If the tag start symbol "<" is given when state transition has been made to a superior hierarchical node, state transition is made to a node representing the tag start symbol "<".

If a character other than the tag start symbol "<" is given when state transition has been made to a superior hierarchical node, state transition is made to that superior hierarchical node. For example, if a character other than the tag start symbol "<" is given when state transition has been made to the hierarchical node N0, state transition is made to the hierarchical node N0, which is the superior hierarchical node.

A series of nodes representing the hierarchical name of a subordinate hierarchical node are placed between a node representing the tag start symbol "<" and the subordinate hierarchical node. For example, a series of nodes representing characters making up a hierarchical name "s", "y", "a", "i", and "n" are placed between the node representing the tag start symbol "<" and the subordinate hierarchical node N1.

A series of nodes representing characters making up a hierarchical name "A", "C", and "T" are placed between the node representing the tag start symbol "<" and the subordinate hierarchical node N2. A series of nodes representing characters making up a hierarchical name "c", "h", "a", "r", and "a" are placed between the node representing the tag start symbol "<" and the subordinate hierarchical node N3.

A series of nodes representing characters making up a hierarchical name "n", "a", "m", and "e" are placed between the node representing the tag start symbol "<" and the subordinate hierarchical node N6. When an arbitrary character string is given when state transition has been made to a node representing the tag start symbol "<", state transition is made to a series of nodes of characters until a hit-missing character appears.

For example, when state transition has been made from the hierarchical node N0 to the node representing the tag start symbol "<", if the scanning position in the XML document 200 is at the character "s", state transition is made from the node representing the tag start symbol "<" to the node representing the character "s". If the next scanning position is at the character "y", state transition is made from the node representing the character "s" to the node representing the character "y". State transition thus continues until a hit-missing character appears at the scanning position.

When state transition has been made to a node representing the end character of a hierarchical name, if the scanning position in the XML document 200 is at the symbol ">", state transition is made from the end character node representing the end character of the hierarchical name to a subordinate hierarchical node.

For example, when state transition has been made from the superior hierarchical node N0 to the end character "n" of the hierarchical name "syain", if the scanning position in the XML document 200 is at the symbol ">", state transition is made from the end character node representing the end character "n" of the hierarchical name to the subordinate hierarchical node N1. In a similar process, state transition is made from other end characters "T", "a", and "e" to the subordinate hierarchical nodes N2, N3, and N6, respectively.

When state transition has been made to a node between a superior hierarchical node and a subordinate hierarchical node, if a hit-missing character appears at a scanning position, state transition is made to the superior hierarchical node. For example, when state transition has been made to the node representing the character "s" between the superior hierarchical node N0 and the subordinate hierarchical node N1, if a hit-missing character other than the character "y" appears at the scanning position, state transition is made to the superior hierarchical node N0.

State transition on the lower half portion will be described. The hierarchy retrieval automaton 501 has a node representing the tag start symbol "</" for the end tag between a subordinate hierarchical node as a transition origin and a superior hierarchical node as a transition destination for the subordinate hierarchical node.

For example, a node representing the tag start symbol "</" for the end tag is placed between the hierarchical node N6 and the hierarchical node N3 superior to the hierarchical node N6, between the hierarchical node N3 and the hierarchical node N2 superior to the hierarchical node N3, between the hierarchical node N2 and the hierarchical node N1 superior to the hierarchical node N2, and between the hierarchical node N1 and the hierarchical node N0 superior to the hierarchical node N1. If the tag start symbol "</" is given when state transition has been made to a subordinate hierarchical node, state transition is made to a node representing the tag start symbol "</".

If a character other than the tag start symbol "</" is given when state transition has been made to a subordinate hierarchical node, state transition is made to that subordinate hierarchical node. For example, if a character other than the tag start symbol "</" is given when state transition has been made to the hierarchical node N6, state transition is made to the hierarchical node N6, which is the superior hierarchical node.

A series of nodes representing the hierarchical name of a subordinate hierarchical node are placed between a node representing the tag start symbol "</" and the superior hierarchical node. For example, a series of nodes representing characters making up a hierarchical name "n", "a", "m", and "e" are placed between the node representing the tag start symbol "</" and the subordinate hierarchical node N3.

A series of nodes representing characters making up a hierarchical name "c", "h", "a", "r", and "a" are placed between the node representing the tag start symbol "</" and the subordinate hierarchical node N2. A series of nodes representing characters making up a hierarchical name "A", "C", and "T" are placed between the node representing the tag start symbol "</" and the subordinate hierarchical node N1.

A series of nodes representing characters making up a hierarchical name "s", "y", "a", "i", and "n" are placed between the node representing the tag start symbol "</" and the subordinate hierarchical node N0. If an arbitrary character string is given when state transition has been made to a node representing the tag start symbol "</", state transition is made to a series of nodes of characters until a hit-missing character appears.

For example, when state transition has been made from the hierarchical node N6 to the node representing the tag start symbol "</", if the scanning position in the XML document 200 is at the character "n", state transition is made from the node representing the tag start symbol "</" to the node representing the character "n". If the next scanning position is at the character "a", state transition is made from the node representing the character "n" to the node representing the character "a". State transition thus continues until a hit-missing character appears at the scanning position.

When state transition has been made to a node representing the end character of a hierarchical name, if the scanning position in the XML document 200 is at the symbol ">", state transition is made from the end character node representing the end character of the hierarchical name to a subordinate hierarchical node.

For example, when state transition has been made from the superior hierarchical node N6 to the end character "n" of the hierarchical name "name", if the scanning position in the XML document 200 is at the symbol ">", state transition is made from the end character node representing the end character "n" of the hierarchical name to the subordinate hierarchical node N3. In a similar process, state transition is made from other end characters "a", "T", and "n" to the subordinate hierarchical nodes N2, N1, and N0, respectively.

When state transition has been made to a node between a subordinate hierarchical node and a superior hierarchical node, if a hit-missing character appears at a scanning position, state transition is made to the subordinate hierarchical node. For example, when state transition has been made to the node representing the character "n" between the subordinate hierarchical node N6 and the superior hierarchical node N3, if a hit-missing character, a character other than the character "n", appears at the scanning position, state transition is made to the superior hierarchical node N6.

The keyword retrieval automaton 502 includes a series of nodes along which state transition is made in the order of characters making up a hit keyword. As depicted in FIG. 5, when the hit keyword is "ブルー" as the retrieval keyword is, a series of nodes representing characters "ブ", "ル", and "ー" are connected so that state transition is made in the order of characters of the hit keyword.

The hierarchy retrieval automaton 501 is connected to the keyword retrieval automaton 502 so that state transition is made between both automatons. For example, when the head character of the hit keyword is given when state transition has been made to a hit hierarchical node in the hierarchy retrieval automaton 501, state transition is made to a node representing the head character in the keyword retrieval automaton 502. For example, when the head character "ブ", of the hit keyword "ブルー" is given when state transition has been made to the hit hierarchical node N6, state transition is made to the node representing the head character "ブ", in the keyword retrieval automaton 502.

When a hit-missing character is given when state transition has been made to any one of nodes in the keyword retrieval automaton 502, state transition is made to a hit hierarchical node. For example, when state transition has been made to the node representing the head character "ブ", and a hit-missing character other than the character "ル", representing the transition destination node appears at a scanning position, state transition is made to the hit hierarchical node N6.

Making state transition to a hit hierarchical node even when hit is made on the hit keyword allows scanning on the XML document 200 to continue. For example, when state transition is made to the node representing the character "ー" matching to the hit keyword results. At this time, however, state transition is made to the hit hierarchical node N6.

In this manner, state transition is made to the keyword retrieval automaton 502 when a scanning position in the XML document 200 has transited to a hit hierarchical node in the hierarchical retrieval automaton 501. This reduces the frequency of processing switchover between the hierarchical retrieval automaton 501 and the keyword retrieval automaton 502.

Because no matching to the hit keyword leads to immediate state transition to a hit hierarchical node, the character string within the retrieval range specified by the hit hierarchical node may be subjected to concentrated retrieval.

In FIG. 4, the retrieving unit 405 has a function of retrieving the hit keyword within the retrieval range from the electronic document using the single automaton 500. For example, the retrieving unit 405 scans the XML document 200 and determines at which hierarchy a scanning position is, using the hierarchy retrieval automaton 501. When state transition is made to a hit hierarchical node, the retrieving unit 405 determines at which character of the hit keyword a scanning position in the XML document 200 is, using the keyword retrieval automaton 502.

The output unit 406 has a function of outputting a character string matching the hit keyword as a retrieval result when the character string matches the hit keyword in the keyword retrieval automaton 502. This output process is carried out as a process of display on the display 131, printout by the printer 132, voice reading, storage in a semiconductor memory or HD, transmission to another computer, etc.

The converting unit 407 has a function of converting the hierarchical name of each of hierarchical nodes making up the path schema 300 into a unique character string composed of a few number of characters. For example, hierarchical names in the electronic document acquired by the acquiring unit 401 are converted into unique character strings. As a result, a path schema generated by the path schema generating unit 402 is turned to a path tree using unique character strings.

A unique character string has fewer characters than a hierarchical name, and is reduced to a single character in an optimal form. A unique numeral of a single character is assigned to each hierarchical name, thereby implementing the conversion process.

Figure 6:
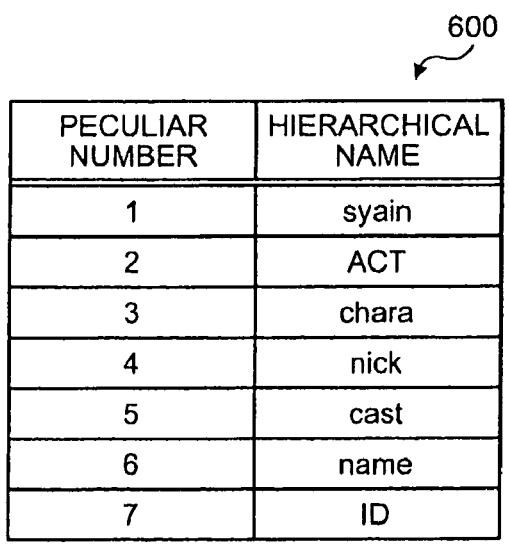
FIG. 6 is an explanatory diagram of a conversion table.
Figure 7:
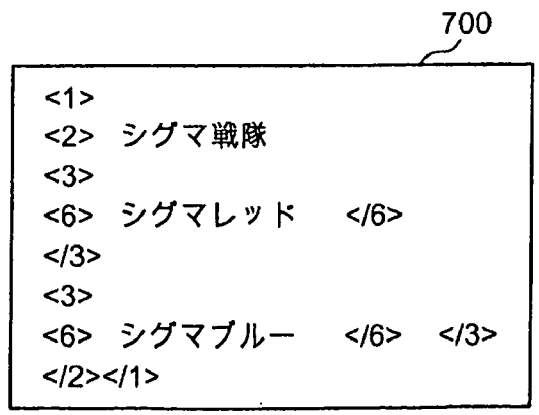
FIG. 7 is an explanatory diagram of a converted XML document.

FIG. 6 is an explanatory diagram of a conversion table. This conversion table 600 is used to convert a hierarchical name into a unique numeral. FIG. 7 is an explanatory diagram of a converted XML document. The XML document 700 of FIG. 7 is the XML document obtained by converting the XML document 200 of FIG. 2 using the conversion table 600.

Figure 8:
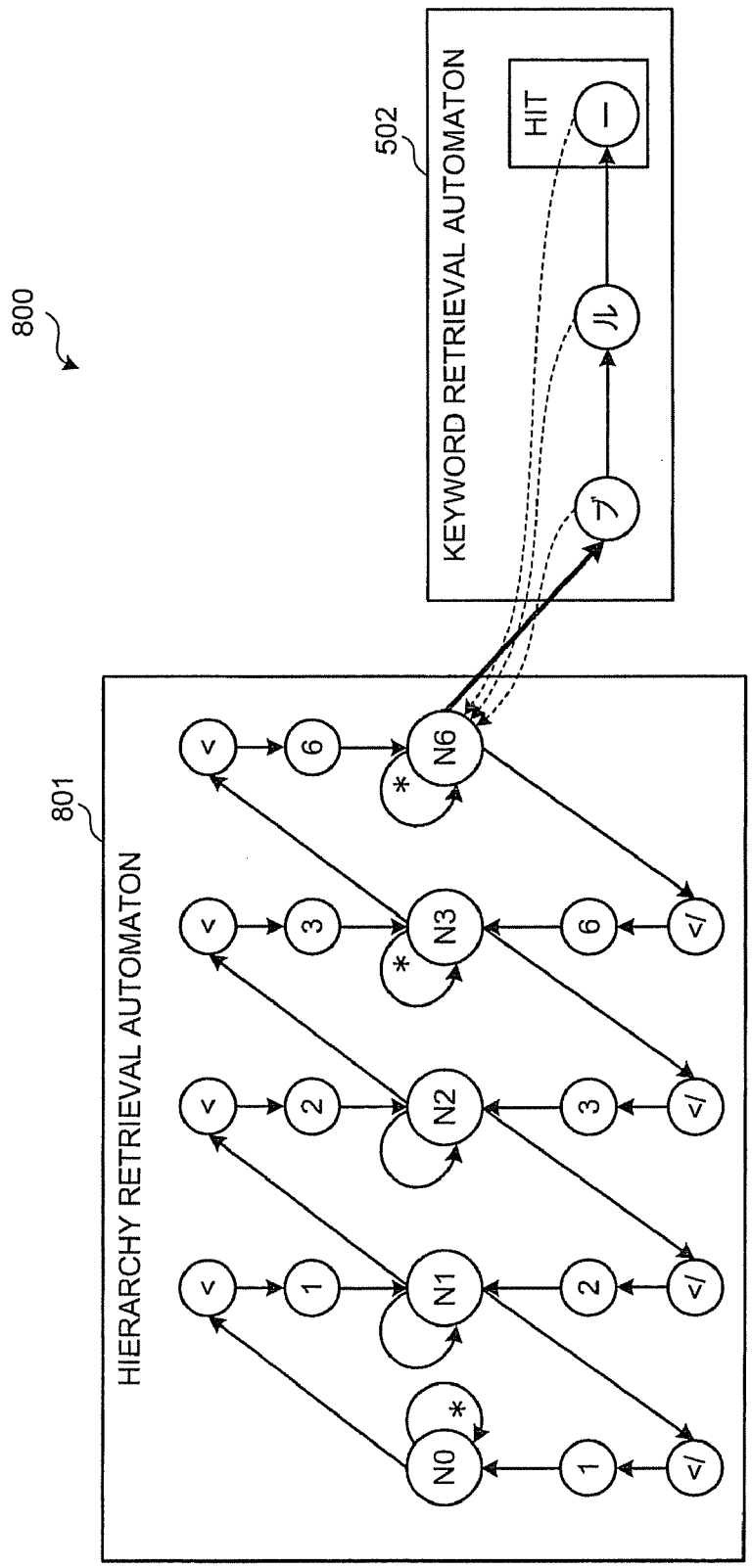
FIG. 8 is an explanatory diagram of a converted single automaton.

FIG. 8 is an explanatory diagram of a converted single automaton. The converted single automaton 800 of FIG. 8 is the automaton that results when retrieval equation (1) is given as in the example depicted in FIG. 5. The converted single automaton 800, however, includes a hierarchy retrieval automaton 801 in which hierarchical names are converted into unique numerals. In the hierarchy retrieval automaton 801, nodes between each hierarchical node as a transition origin and each hierarchical node as a transition destination consist of a node representing the tag start symbol and a node representing a unique numeral. This enables a reduction in the frequency of state transition, thus improves retrieval speed.

Figure 9:
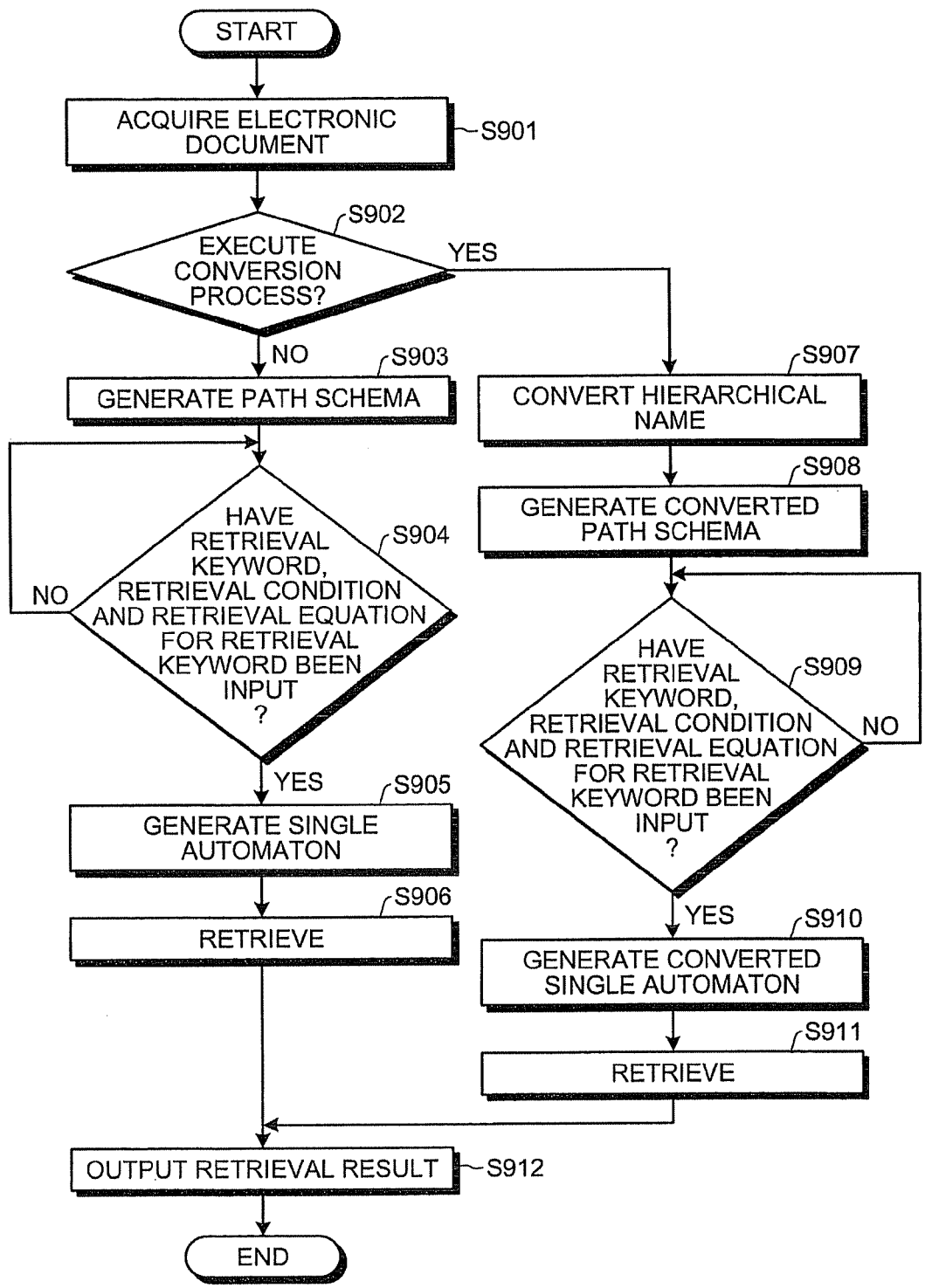
FIG. 9 is a flowchart of an information retrieving procedure of the first embodiment.

FIG. 9 is a flowchart of an information retrieving procedure of the first embodiment. As depicted in FIG. 9, the acquiring unit 401 acquires an electronic document (XML document 200) having a hierarchical structure (step S901).

Subsequently, it is determined whether the conversion process by the converting unit 407 is to be executed (step S902). When it is determined that the conversion process is not to be executed (step S902: NO), the path schema generating unit 402 generates the path schema 300 (step S903), after which input of a retrieval keyword, a retrieval condition for the retrieval keyword, and a retrieval equation is waited for (step S904: NO).

When the retrieval keyword, the retrieval condition, and the retrieval equation have been input (step S904: YES), the automaton generating unit 404 generates the single automaton 500 (step S905), which is used to execute retrieval (step S906). The procedure then proceeds to step S912.

When it is determined at step S902 that conversion is to be executed (step S902: YES), hierarchical names in the electronic document (XML document 200) are converted according to the conversion table 600 (step S907). The path schema generating unit 402 then generates a converted path schema (step S908), after which input of a retrieval keyword, a retrieval condition for the retrieval keyword, and a retrieval equation is waited for (step S909: NO).

When the retrieval keyword, the retrieval condition, and the retrieval equation have been input (step S909: YES), the automaton generating unit 404 generates the converted single automaton 800 (step S910), which is used to execute retrieval (step S911). The procedure then proceeds to step S912. Finally, the output unit 406 outputs a retrieval result (step S912), ending a series of the processing.

According to the first embodiment, the frequency of processing switchover between the hierarchical retrieval automaton 501 (801) and the keyword retrieval automaton 502 is reduced. Because no matching to the hit keyword leads to immediate state transition to a hit hierarchical node, the character string within the retrieval range specified by the hit hierarchical node is subjected to concentrated retrieval, facilitating creation of hardware architecture.

According to the first embodiment, paths acquired from a path schema are all expressed in an automaton. In contrast, according to a second embodiment, a partial path schema is extracted from a path schema, the partial path schema serving as a path tree along which a path starts from the root node to reach a hit hierarchical node in a unique manner, thereby enabling a reduction in the size of a hierarchy retrieval automaton in a generated single automaton.

The constituent elements identical to constituent elements of the first embodiment are denoted by similar reference numerals used in the first embodiment and further description thereof is omitted. To simplify explanation, unless noted, explanation will be given without distinction of whether the conversion table 600 is used.

FIG. 10 is an explanatory diagram of an example of an electronic document to be searched according to the second embodiment. An XML document 1000 is an electronic document to be searched.

Figure 11:
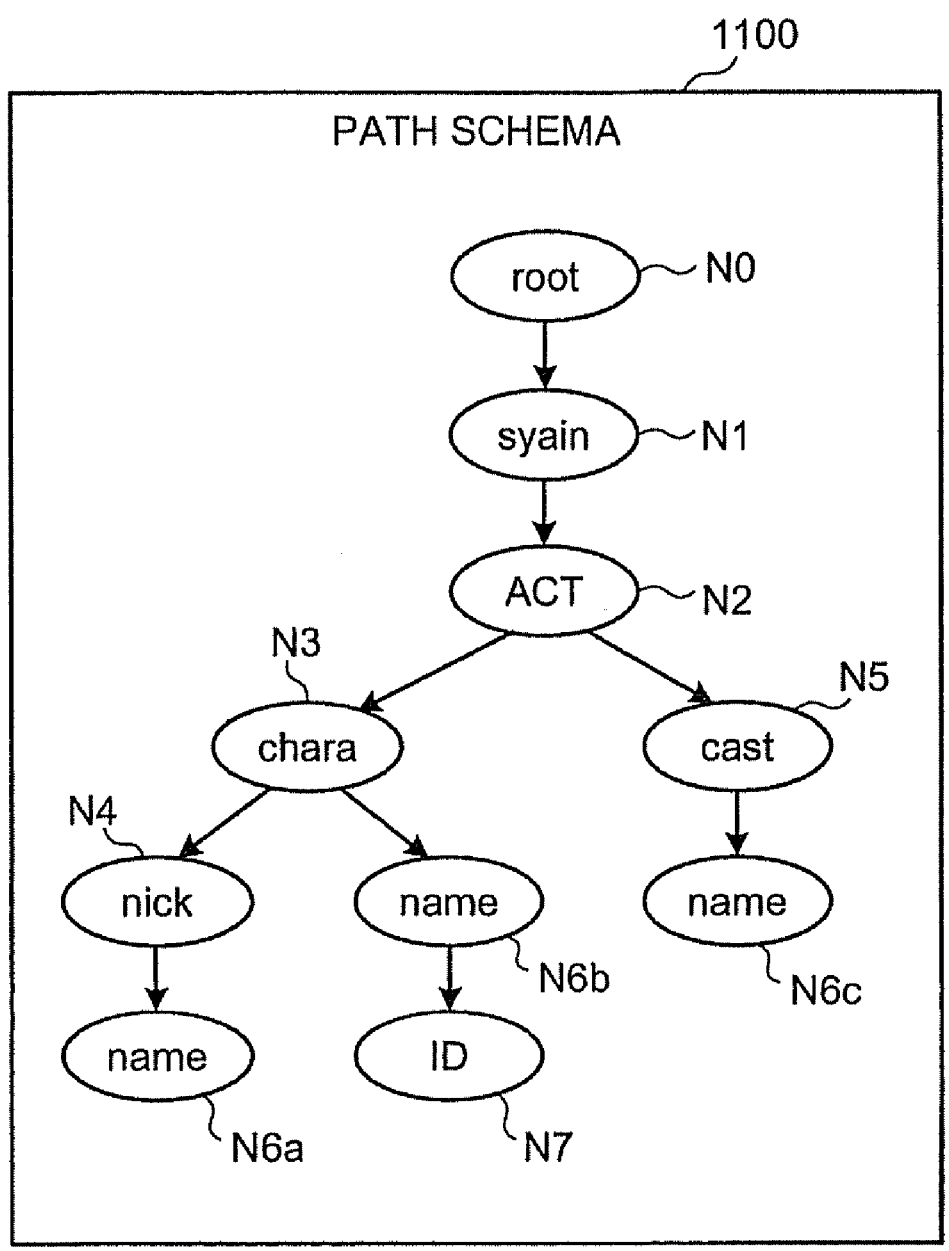
FIG. 11 is an explanatory diagram of a path schema according to the second embodiment.

FIG. 11 is an explanatory diagram of a path schema according to the second embodiment. The path schema 1100 of FIG. 11 is the path schema related to the XML document 1000 of FIG. 10.

In the path schema 1100 depicted in FIG. 11, the hierarchical node N0 is the root node, the hierarchical node N1 represents the hierarchical name "syain", the hierarchical node N2 represents the hierarchical name "ACT", the hierarchical node N3 represents the hierarchical name "chara", a hierarchical node N4 represents a hierarchical name "nick", a hierarchical node N5 represents a hierarchical name "cast", and a hierarchical node N7 represents a hierarchical name ID.

Three identical hierarchical nodes N6 each representing the hierarchical name "name" are present in the path schema 1100. To distinguish these hierarchical nodes N6 from each other, a child hierarchical node to the hierarchical node N4 is named hierarchical node N6a, a child hierarchical node to the hierarchical node N3 is named hierarchical node N6b, and a child hierarchical node to the hierarchical node N5 is named hierarchical node N6c.

Figure 12:
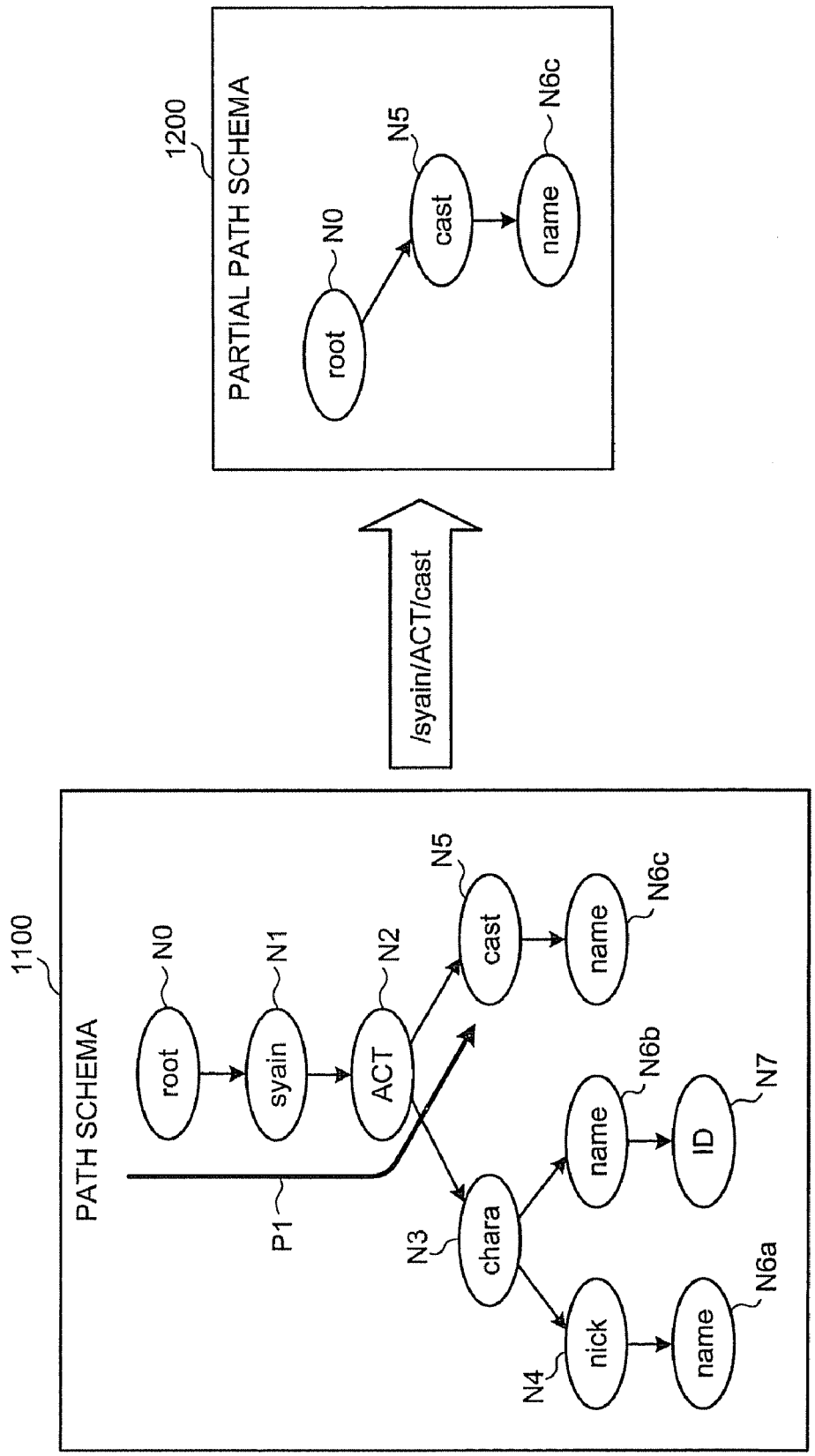
FIG. 12 is an explanatory diagram of a first example of extraction of a partial path schema.

FIG. 12 is an explanatory diagram of a first example of extraction of a partial path schema. In FIG. 12, when retrieval equation (2) is given, a path P1 passing through "syain", "ACT", and "cast" is extracted as a partial path schema 1200. Because this path P1 is a unique path, a path tree made up of the hierarchical node N0, the hierarchical node N5 representing "cast", and the hierarchical node N6c representing "name" that is the child node to the hierarchical node N5 is extracted as the partial path schema. The hierarchical nodes representing "syain" and "ACT" in the course of the path P1 are deleted. Of course, hierarchical nodes deviating from the path P1 are also deleted.

$$/syain/ACT/cast="ブルー" \qquad (2)$$

Figure 13:
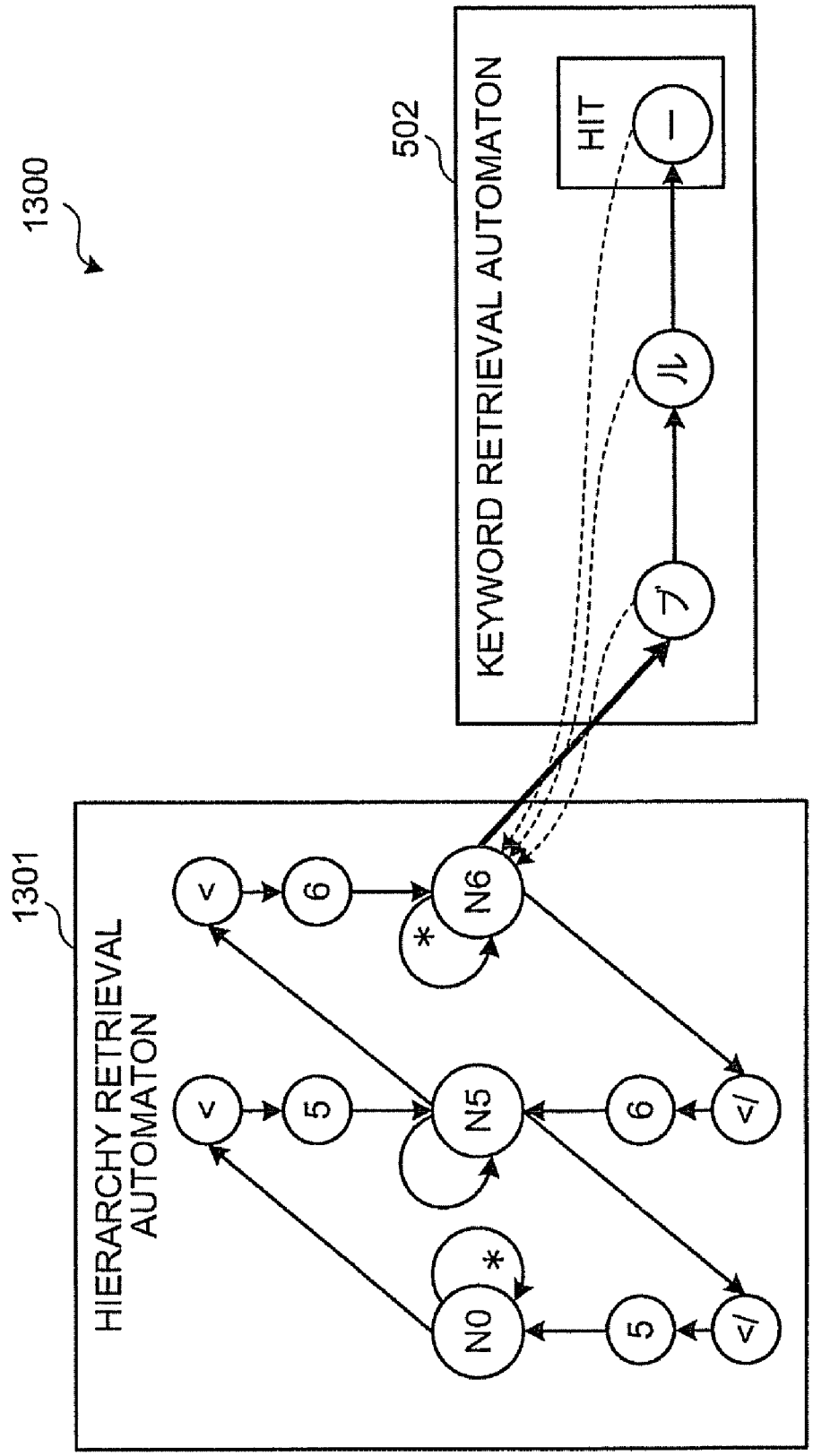
FIG. 13 is an explanatory diagram of a single automaton that results when a hierarchical retrieval automaton is configured using the partial path schema depicted in FIG. 12.

FIG. 13 is an explanatory diagram of a single automaton that results when a hierarchical retrieval automaton is configured using the partial path schema 1200 of FIG. 12. In this single automaton 1300, the hierarchical retrieval automaton 1301 does not include the hierarchical nodes N1 to N4 and N7 that do not make up the partial path schema 1200. The size of the hierarchical retrieval automaton 1301 is, therefore, reduced and enables a reduction in the frequency of state transition, thus improving retrieval speed.

Figure 14:
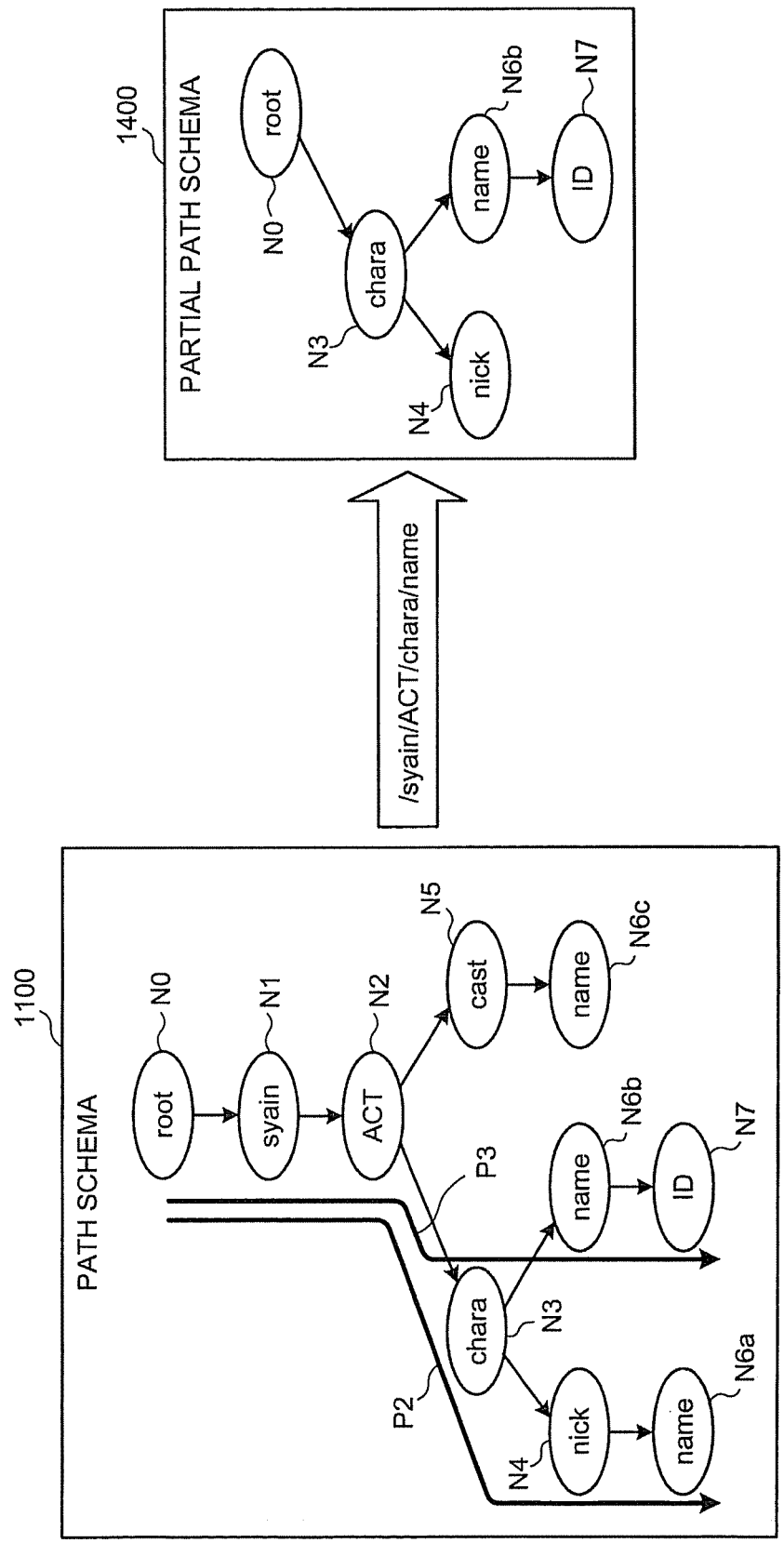
FIG. 14 is an explanatory diagram of a second example of extraction of a partial path schema.

FIG. 14 is an explanatory diagram of a second example of extraction of a partial path schema. In FIG. 12, when retrieval equation (3) is given, a path passing through "syain", "ACT", "cast", "chara", and "name" is extracted as a partial path schema 1400. Because path P1 and path P2 are common up to the hierarchical node N2, the hierarchical nodes N1 and N2 are deleted.

The hierarchical node N6a is not a hit hierarchical node, and is therefore deleted. The hierarchical node N4 remains in the partial path schema so that a destination of a branch path from the hierarchical node N3 is specified. The hierarchical node N6b is the hit hierarchical node, and therefore remains. The hierarchical node N7 is a child hierarchical node to the hierarchical node N6b, and therefore remains. The hierarchical nodes N5 and N6c are out of paths P2 and P3, and are therefore deleted.

$$/syain/ACT/cast/chara/name="ブルー" \qquad (3)$$

Figure 15:
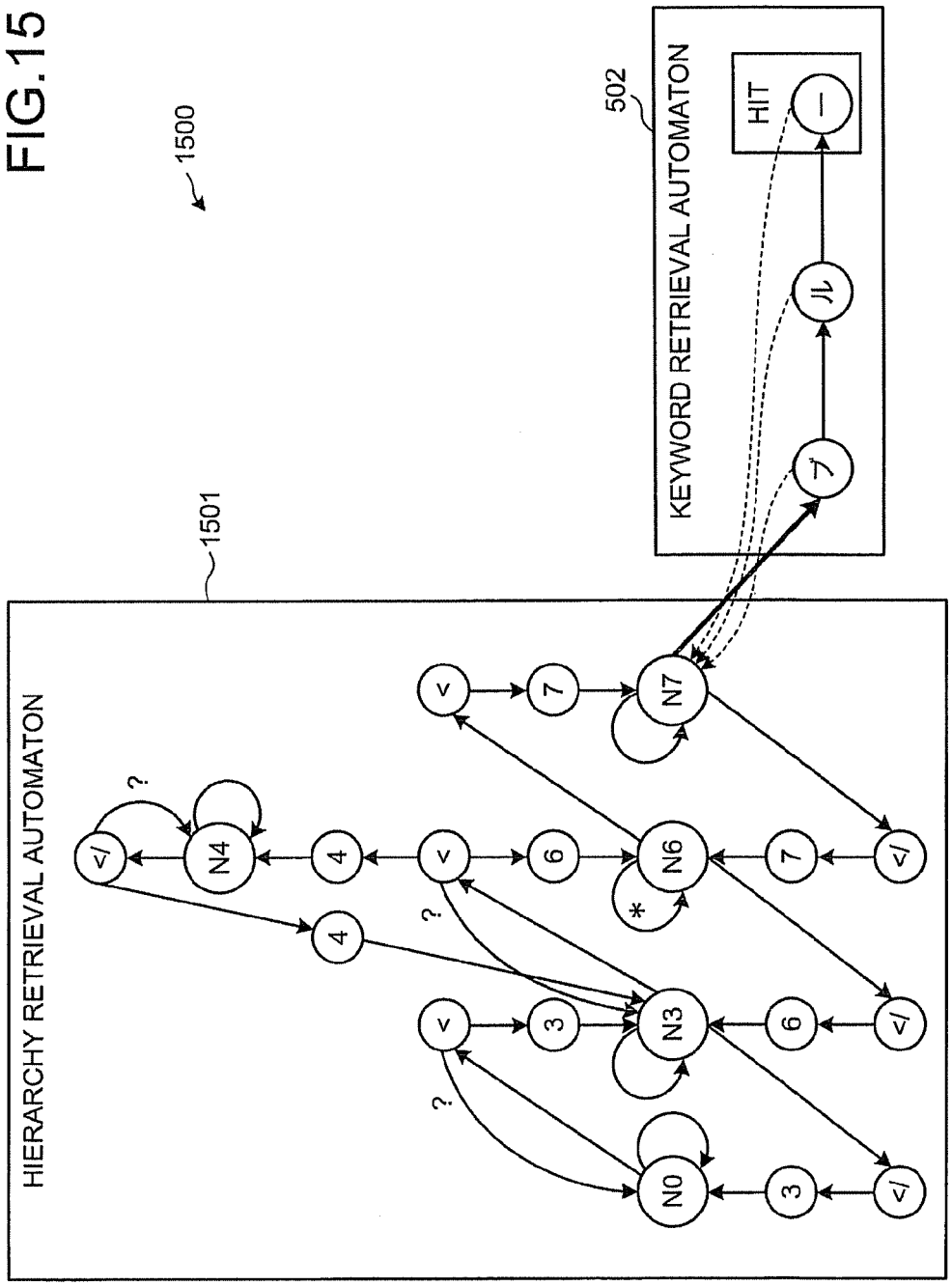
FIG. 15 is an explanatory diagram of a single automaton that results when a hierarchical retrieval automaton is configured using the partial path schema depicted in FIG. 14.

FIG. 15 is an explanatory diagram of a single automaton 1500 that results when a hierarchical retrieval automaton is configured using the partial path schema 1400 of FIG. 14. The hierarchical retrieval automaton 1501 does not include the hierarchical nodes N1, N2 and N5 that do not make up the partial path schema 1400. The size of the hierarchical retrieval automaton 1501 is, therefore, reduced and enables a reduction in the frequency of state transition, thus improving retrieval speed.

Figure 16:
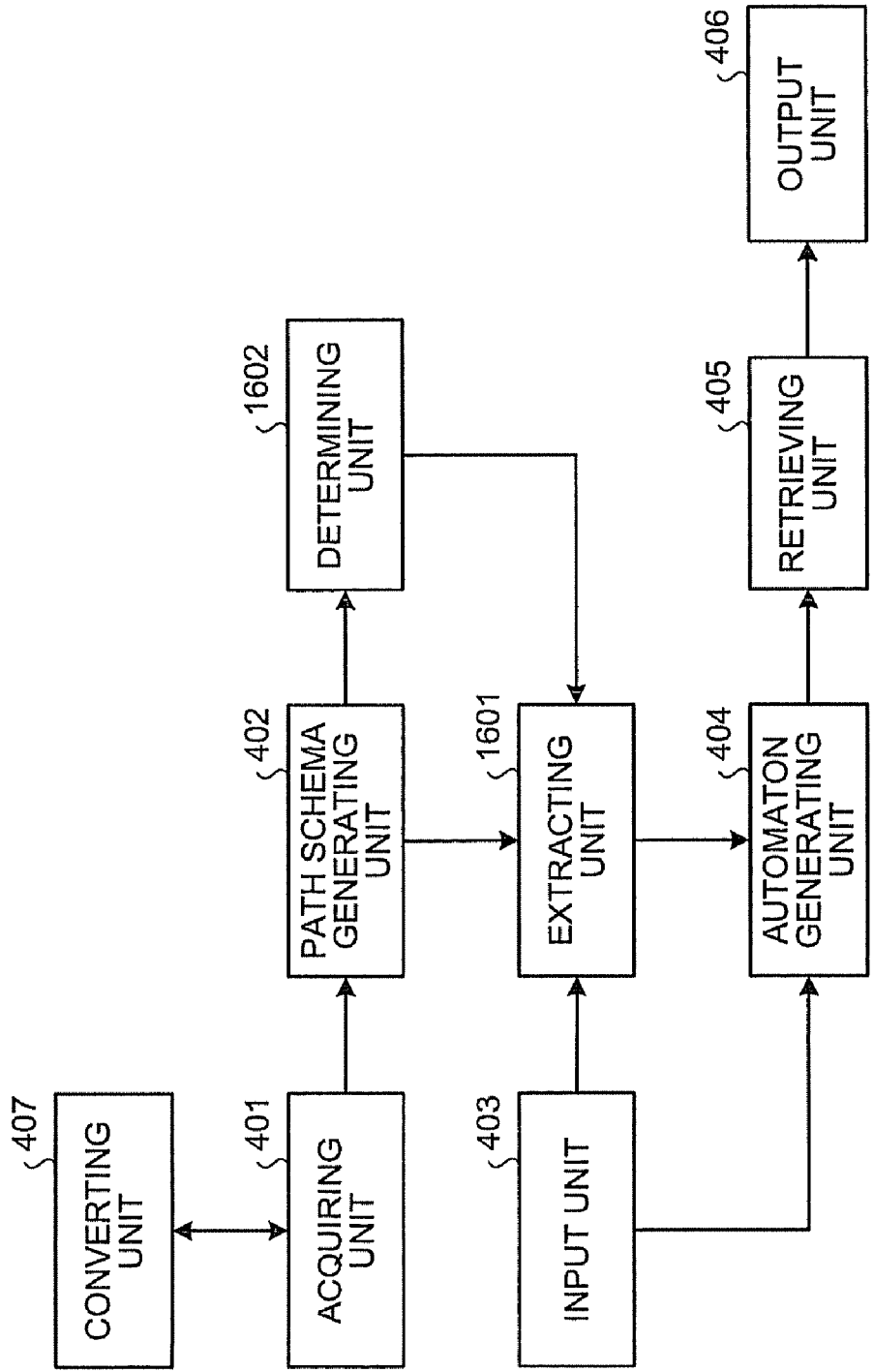
FIG. 16 is a block diagram of a functional configuration of the information retrieving apparatus according to the second embodiment.

FIG. 16 is a block diagram of a functional configuration of the information retrieving apparatus 100 according to the second embodiment. As depicted in FIG. 16, the information retrieving apparatus 100 includes an extracting unit 1601 and a determining unit 1602, in addition to the functional units 401 to 407 depicted in FIG. 4.

The functions of these functional units 1601 to 1602 are implemented by causing the processor in the information retrieving apparatus 100 to execute a relevant program stored in the memory in the information retrieving apparatus 100 or through the input/output I/F.

Output data from each of the functional units 1601 and 1602 is saved to the memory. The function of a functional unit at a connection destination indicated by an arrow in FIG. 16 is implemented by reading from the memory, data output from a functional unit at the connection origin and causing the processor in the information retrieving apparatus 100 to execute a program relevant to the function.

The extracting unit 1601 extracts from a path schema, a partial path schema related to a retrieval range specified by a retrieval equation. For example, when a path specified by the retrieval equation is the sole path, i.e., the unique path, a path tree having a root node, a hit hierarchical node, and a child node to the hit hierarchical node is extracted as the partial path schema from the path schema. For example, the partial path schema 1200 is extracted, as depicted in FIG. 12.

When multiple paths specified by the retrieval equation are present, a partial path schema is extracted according to an arrangement pattern of the paths. A specific example of extraction will be explained in the description of the determining unit 1602.

At any rate, as depicted in FIGS. 13 and 15, the automaton generating unit 404 generates the single automatons 1300 and 1500, which include the hierarchy retrieval automatons 1301 and 1501 that retrieve the hierarchies of the partial schemata 1200 and 1400 and the hit keyword automatons 502 and 502 that retrieve a hit keyword, respectively.

The determining unit 1602 determines whether multiple paths specified by the retrieval equation are present in the path schema 1100. For example, whether multiple paths are present may be determined based on the presence/absence of multiple nodes each representing a hierarchy name at the end of the retrieval equation. For example, as depicted in FIG. 12, the path specified by retrieval equation (2) is determined from the path schema 1100 to be the path P1, which is thus defined as the unique path. Meanwhile, paths specified by retrieval equation (3) are determined from the path schema 1100 to be two paths, including the paths P2 and P3, as depicted in FIG. 14.

When the presence of multiple paths is determined, the determining unit 1602 determines to which arrangement pattern, the arrangement pattern of paths corresponds.

Figure 17:
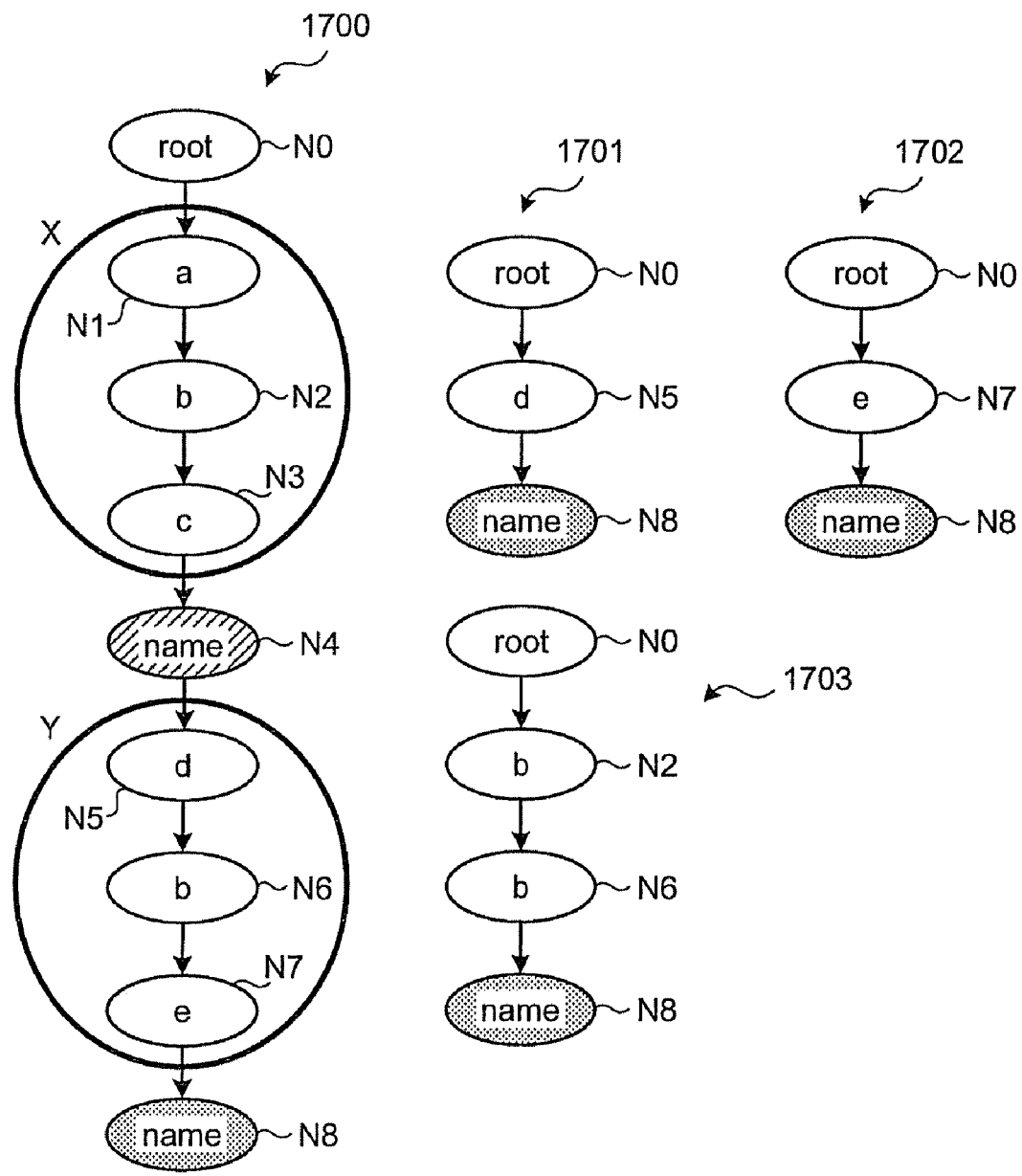
FIG. 17 is an explanatory diagram of an arrangement pattern A.

FIG. 17 is an explanatory diagram of an arrangement pattern A. The arrangement pattern A is an arrangement pattern in which a "similar node" having a similar hierarchical name as a hit hierarchical node is present in a hierarchy superior to the hit hierarchical node. In FIG. 17, when a retrieval equation is "/a/b/name", for example, a path from the hierarchical node N0 to the hierarchical node N4 and a path from the hierarchical node N0 to the hierarchical node N8 of a path schema 1700 are specified. If the hierarchical node N8 among the hierarchical nodes N4 and N8 is determined to be the hit hierarchical node, the hierarchical node N4 is determined to be the similar node.

The arrangement pattern A includes extraction patterns A-1 and A-2. The extraction pattern A-1 enables extraction of a partial path schema that include the root node N0, an intermediate hierarchical node present between the similar node and the hit hierarchical node, and the hit hierarchical node.

According to the extraction pattern A-1, a partial path schema 1701 may be extracted, which includes the root node N0, the intermediate hierarchical node N5 present in a set Y, and the hit hierarchical node N8. Likewise, a partial path schema 1702 may be extracted, which includes the root node N0, the intermediate hierarchical node N7, and the hit hierarchical node N8.

The extraction pattern A-2 enables extraction of a partial path schema that includes the root node N0, an intermediate hierarchical node present between the similar node and the hit hierarchical node, another intermediate hierarchical node present between the root node N0 and the similar node and having a similar hierarchical name as the intermediate hierarchical node, and the hit hierarchical node.

According to the extraction pattern A-2, a partial path schema 1703 may be extracted, which includes the root node N0, the intermediate hierarchical node N6 present in the set Y, another intermediate hierarchical node N2 present in a set X, and the hit hierarchical node N8.

If a node deep down in hierarchy from the root node N0 is selected as an intermediate hierarchical node, the selected node may also be used as an intermediate hierarchical node to another similar node, which leads to a reduction in the number of nodes.

Figure 18:
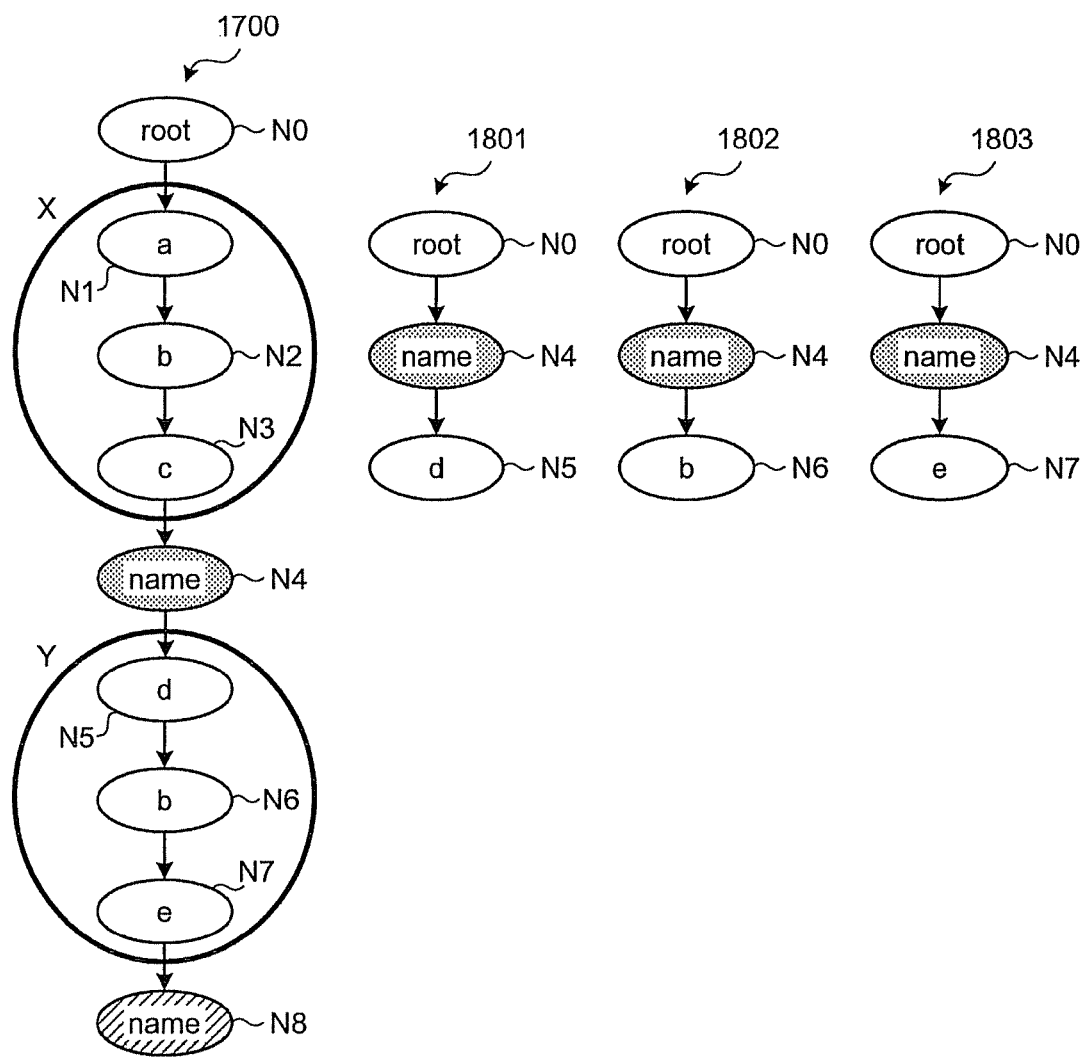
FIG. 18 is an explanatory diagram of an arrangement pattern B.

FIG. 18 is an explanatory diagram of an arrangement pattern B. The arrangement pattern B is an arrangement pattern in which a "different hierarchy node" having a similar hierarchical name as a hit hierarchical node is present in a hierarchy subordinate to the hit hierarchical node. In FIG. 18, when a retrieval equation is "/a/b/name", for example, a path from the hierarchical node N0 to the hierarchical node N4 and a path from the hierarchical node N0 to the hierarchical node N8 of a path schema 1700 are specified. If the hierarchical node N4 among the hierarchical nodes N4 and N8 is determined to be the hit hierarchical node, the hierarchical node N8 is determined to be the similar node.

The arrangement pattern B includes an extraction pattern B-1. The extraction pattern B-1 enables extraction of a partial path schema that includes the root node N0, the hit hierarchical node, and a child hierarchical node present between the hit hierarchical node and the similar node.

According to the extraction pattern B-1, partial path schemata 1801 to 1803 may be extracted, each of which includes the root node N0, the hit hierarchical node N4, and respective child hierarchical nodes N5, N6, and N7 present in the set Y (between the hit hierarchical node N4 and the similar node N8).

Figure 19:
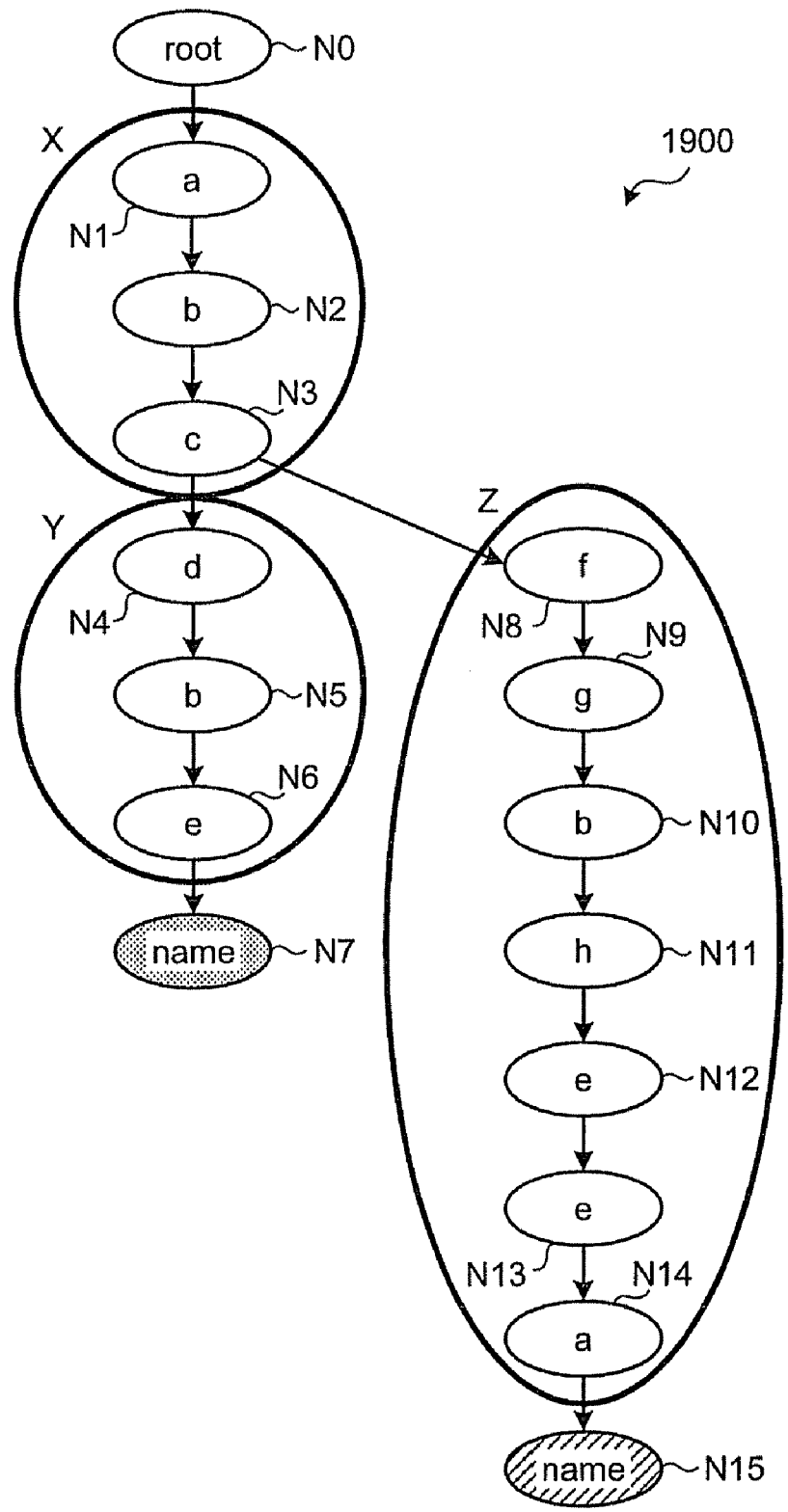
FIG. 19 is an explanatory diagram of a path schema to which an arrangement pattern C is applied.

FIG. 19 is an explanatory diagram of a path schema to which an arrangement pattern C is applied. The arrangement pattern C is an arrangement pattern in which a similar node is present in a path that branches from a branch origin hierarchical node present in a hierarchy superior to a hit hierarchical node. In FIG. 19, for example, when a retrieval equation is "/a/b/name", a path from the hierarchical node N0 to the hierarchical node N7 and a path from the hierarchical node N0 to the hierarchical node N3 and from the hierarchical node N8 to the hierarchical node N15 of a path schema 1900 are specified. If the hierarchical node N7 among the hierarchical nodes N7 and N15 is determined to be the hit hierarchical node, the hierarchical node N15 is determined to be the similar node.

The arrangement pattern C includes extraction patterns C-1 to C-6. The extraction pattern C-1 enables extraction of a partial path schema that includes the root node N0, an intermediate hierarchical node present between the branch origin hierarchical node and the hit hierarchical node, and the hit hierarchical node.

Figure 20:
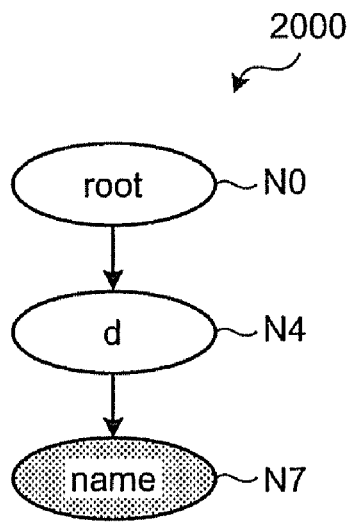
FIG. 20 is an explanatory diagram of a partial path schema that is extracted based on an extraction pattern C-1.

FIG. 20 is an explanatory diagram of a partial path schema that is extracted based on the extraction pattern C-1. The extraction pattern C-1 enables extraction of a partial path schema that includes the root node N0, an intermediate hierarchical node present between the branch origin hierarchical node and the hit hierarchical node, and the hit hierarchical node.

According to the extraction pattern C-1, a partial path schema 2000 may be extracted, which includes the root node N0, the intermediate hierarchical node N4 present in the set Y (between the branch origin hierarchical node N3 and the hit hierarchical node N7), and the hit hierarchical node N7.

The hierarchical node N5 in the set Y of FIG. 19 is not selected because the hierarchical node N2 in the set X and the hierarchical node N10 in a set Z respectively have a similar hierarchical name b. Likewise, the hierarchical node N6 is not selected because the hierarchical nodes N12 and N13 having a similar hierarchical name e as the hierarchical node N6 are present in the set Z.

Figure 21:
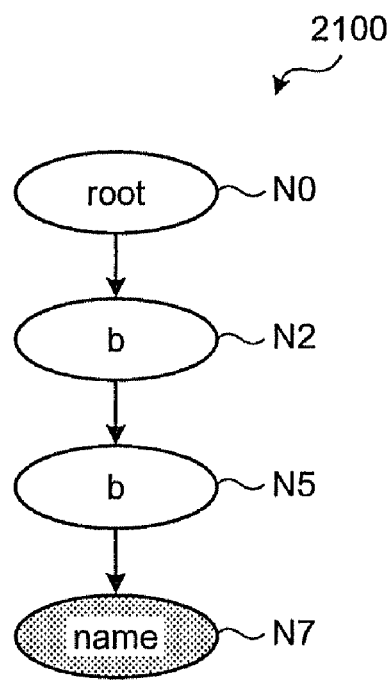
FIG. 21 is an explanatory diagram of a partial path schema that is extracted based on an extraction pattern C-2.

FIG. 21 is an explanatory diagram of a partial path schema that is extracted based on the extraction pattern C-2. The extraction pattern C-2 enables extraction of a partial path schema that includes the root node N0, an intermediate hierarchical node that is present between the branch origin hierarchical node and the hit hierarchical node and is not present between the branch origin hierarchical node and the similar node, another intermediate hierarchical node that is present between the root node and the branch origin hierarchical node and has a similar hierarchical name as the intermediate hierarchical node, and the hit hierarchical node.

According to the extraction pattern C-2, a partial path schema 2100 may be extracted, which includes the root node N0, the intermediate hierarchical node N5 present in the set Y (between the branch origin hierarchical node N3 and the hit hierarchical node N7) and not present in the set Z (between the branch origin hierarchical node N3 and the similar node N15), another intermediate hierarchical node N2 present in the set X (between the root node N0 and the branch origin hierarchical node N3) and having a similar hierarchical name as the intermediate hierarchical node N5, and the hit hierarchical node N7.

Figure 22:
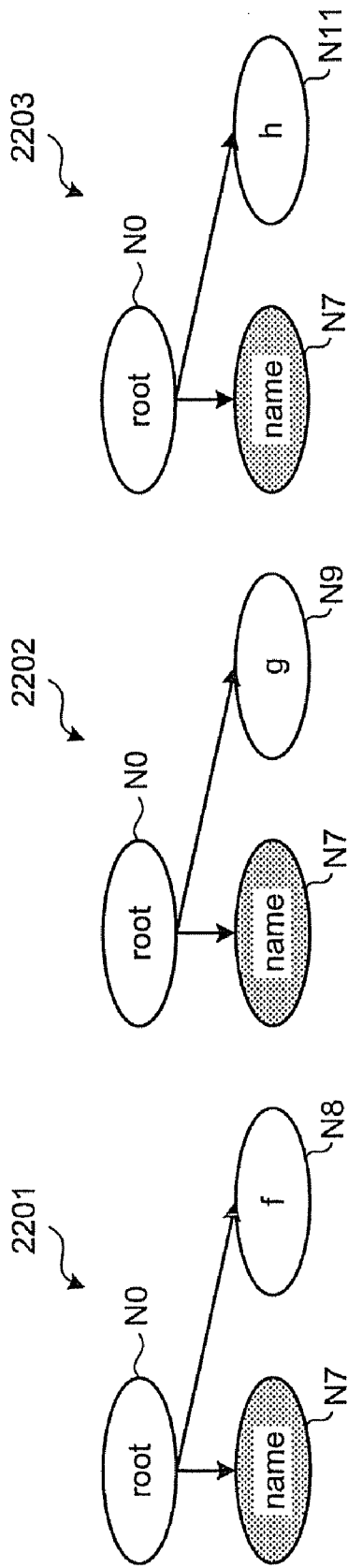
FIG. 22 is an explanatory diagram of a partial path schema that is extracted based on an extraction pattern C-3.

FIG. 22 is an explanatory diagram of a partial path schema that is extracted based on the extraction pattern C-3. The extraction pattern C-3 enables extraction of a partial path schema that includes the root node N0, the hit hierarchical node, and a branch destination hierarchical node present between the branch origin hierarchical node and the similar node.

According to the extraction pattern C-3, partial path schemata 2201 to 2203 may be extracted, which include the root node N0, the hit hierarchical node N7, and a branch destination node N8, N9, or N11 that are present in the set Z (between the hierarchical node N3 which is the branch origin and the similar node N15).

Figure 23:
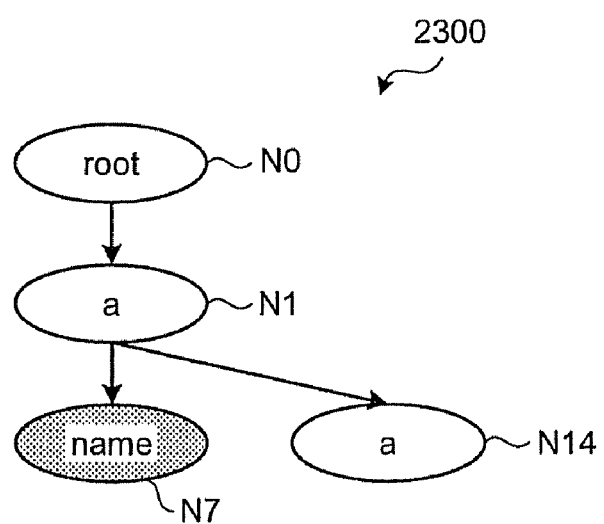
FIG. 23 is an explanatory diagram of a partial path schema that is extracted based on an extraction pattern C-4.

FIG. 23 is an explanatory diagram of a partial path schema that is extracted based on the extraction pattern C-4. The extraction pattern C-4 enables extraction of a partial path schema that includes the root node N0, an intermediate hierarchical node that is present between the branch origin hierarchical node and the similar node and is not present between the branch origin hierarchical node and the hit hierarchical node, another intermediate hierarchical node that is present between the root node N0 and the branch origin hierarchical node and has a similar hierarchical name as the intermediate hierarchical node, and the hit hierarchical node.

According to the extraction pattern C-4, a partial path schema 2300 may be extracted, which includes the root node N0, the intermediate hierarchical node N14 present in the set Z (between the branch origin hierarchical node N3 and the similar node N15) and not present in the set Y (between the branch origin hierarchical node N3 and the hit hierarchical node N7), another intermediate hierarchical node N1 present in the set X (between the root node N0 and the branch origin hierarchical node N3) and having a similar hierarchical name as the intermediate hierarchical node N14, and the hit hierarchical node N7.

Figure 24:
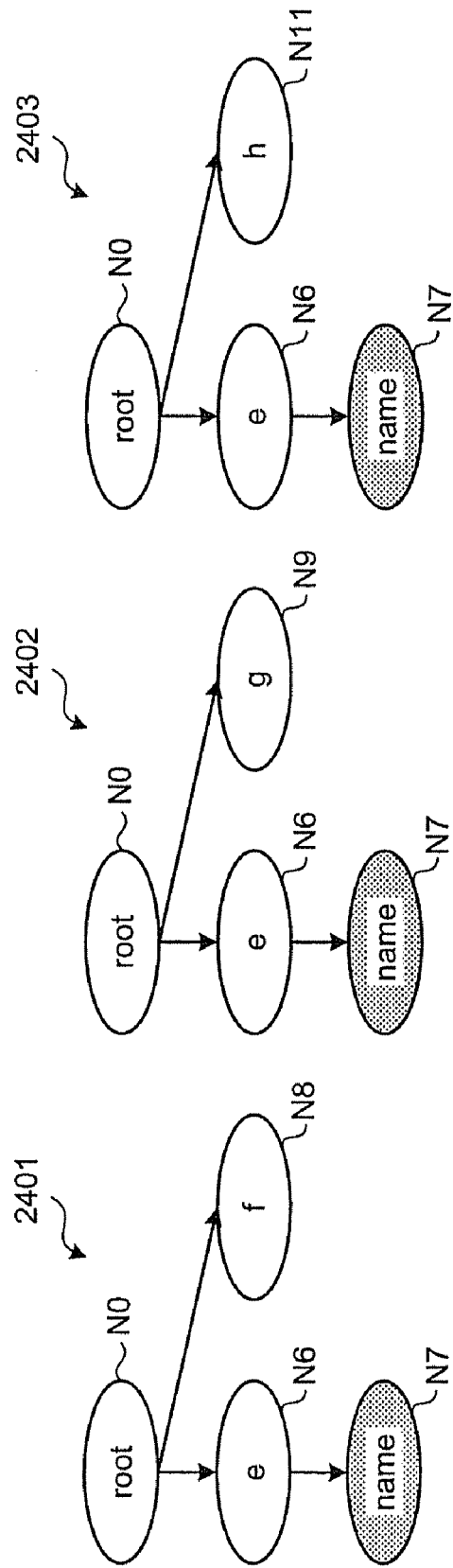
FIG. 24 is an explanatory diagram of a partial path schema that is extracted based on an extraction pattern C-5.

FIG. 24 is an explanatory diagram of a partial path schema that is extracted based on the extraction pattern C-5. The extraction pattern C-5 enables extraction of a partial path schema that includes the root node N0, a first intermediate hierarchical node that is not present between the root node N0 and the branch origin hierarchical node and is present between the branch origin hierarchical node and the hit hierarchical node, and a third intermediate hierarchical node between an intermediate hierarchical node and the branch origin hierarchical node, the intermediate hierarchical node being the highest in hierarchy among second intermediate hierarchical nodes that are not present between the root node N0 and the first intermediate hierarchical node and have a similar hierarchical name as the first intermediate hierarchical node.

According to the extraction pattern C-5, partial path schemata 2401 to 2403 may be extracted, which include the root node N0, the first intermediate hierarchical node N6 that is not present in the set X (between the root node N0 and the branch hierarchical node N3) and is present in the set Y (between the branch hierarchical node N3 and the hit hierarchical node N7), and the third intermediate hierarchical nodes N8, N9, or N11 between the intermediate hierarchical node N12 and the branch origin hierarchical node N3, the intermediate hierarchical node N12 being the highest in hierarchy among the second intermediate hierarchical nodes N12 and N13 not present between the root node N0 and the first intermediate hierarchical node N6 and having a similar hierarchical name as the first intermediate hierarchical node N6.

Figure 25:
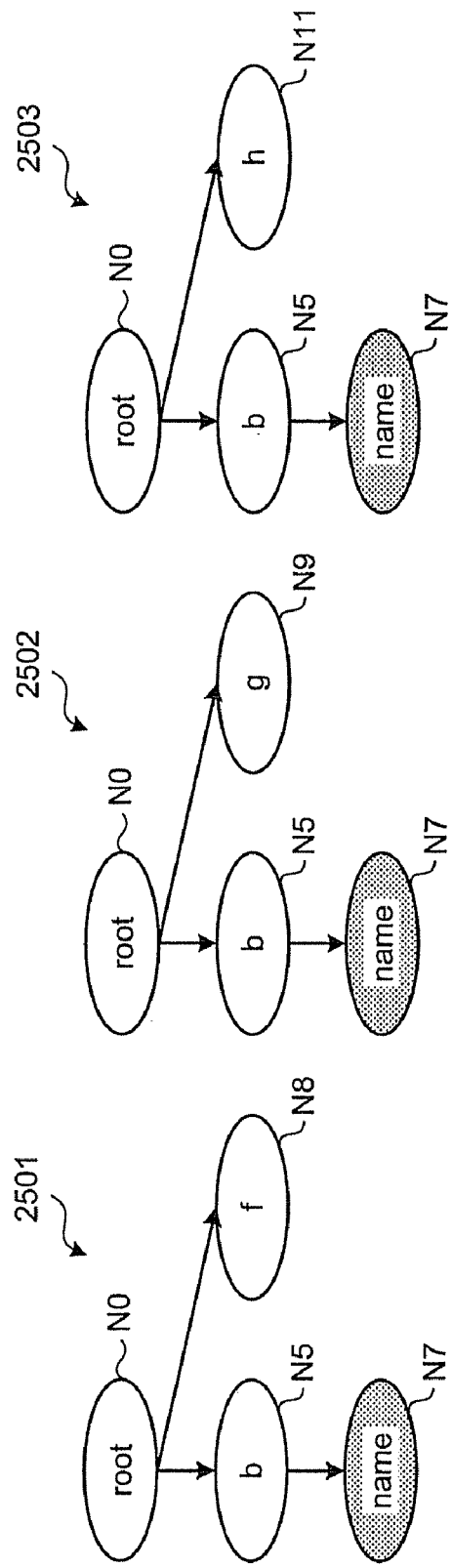
FIG. 25 is an explanatory diagram of a partial path schema that is extracted based on an extraction pattern C-6.

FIG. 25 is an explanatory diagram of a partial path schema that is extracted based on the extraction pattern C-6. The extraction pattern C-6 enables extraction of a partial path schema that includes the root node N0, a first intermediate hierarchical node present between the branch origin hierarchical node and the hit hierarchical node, and a third intermediate hierarchical node between an intermediate hierarchical node and the branch origin hierarchical node, the intermediate hierarchical node being the highest in hierarchy among second intermediate hierarchical nodes not present between the branch origin hierarchical node and the first intermediate hierarchical node and having a similar hierarchical name as the first intermediate hierarchical node.

According to the extraction pattern C-6, partial path schemata 2501 to 2503 may be extracted, which include the root node N0, the first intermediate hierarchical node N5 present in the set Y (between the branch hierarchical node N3 and the hit hierarchical node N7), and the third intermediate hierarchical nodes N8 or N9 between the intermediate hierarchical node N10 and the branch origin hierarchical node N3, the intermediate hierarchical node N10 being the highest in hierarchy among the second intermediate hierarchical nodes N10 not present between the branch origin hierarchical node N3 and the first intermediate hierarchical node N5 and having a similar hierarchical name as the first intermediate hierarchical node N5.

Figure 26:
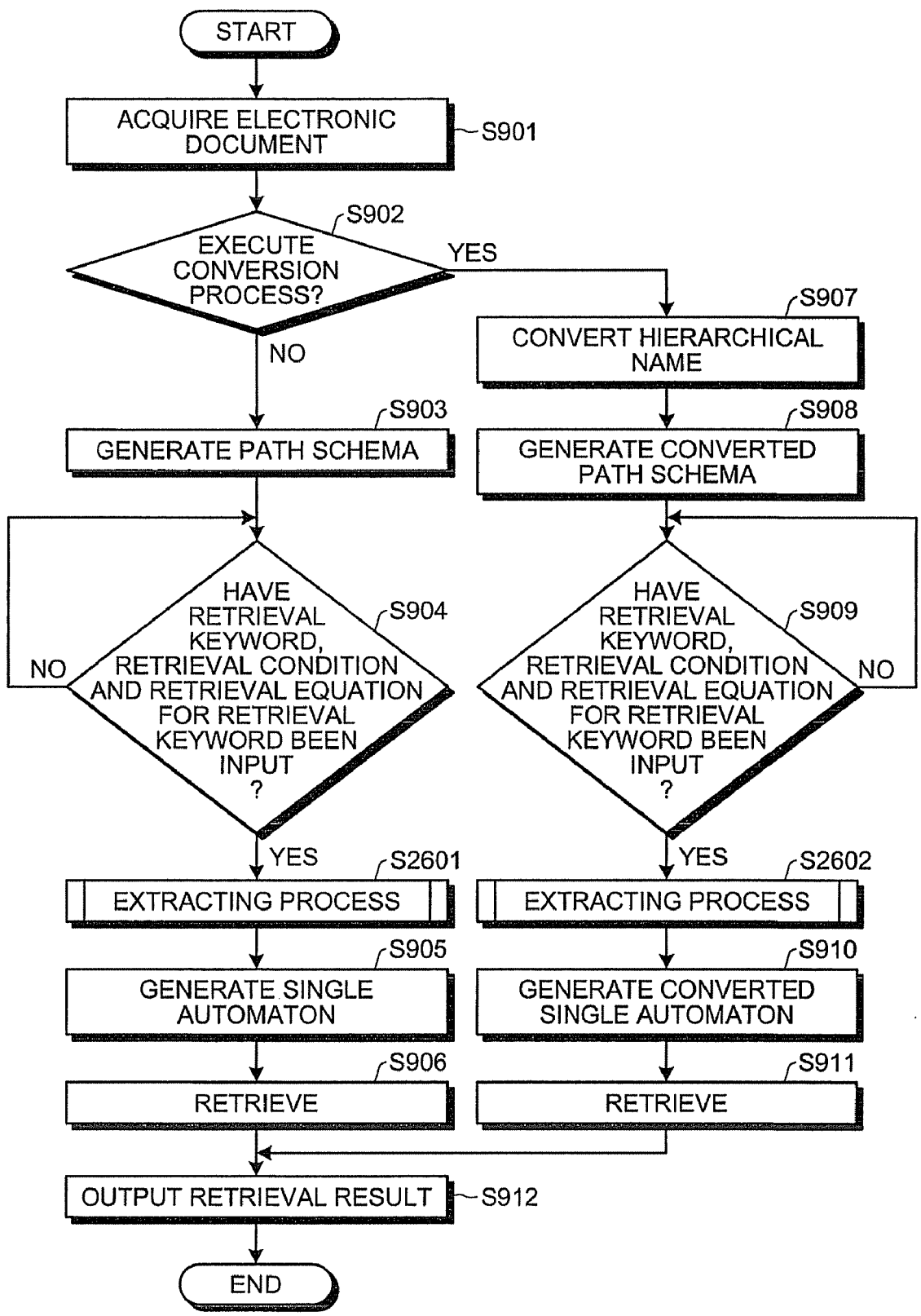
FIG. 26 is a flowchart of an information retrieving procedure according to the second embodiment.

FIG. 26 is a flowchart of an information retrieving procedure according to the second embodiment. In FIG. 26, processing identical to that depicted in FIG. 9 will be denoted by similar reference numerals used in FIG. 9 and further description thereof will be omitted.

As depicted in FIG. 26, the extracting process is executed from steps S904 to S905 (step S2601). The extracting process (step S2601) is executed by the determining unit 1602 and the extracting unit 1601. In the single automaton generation at step S905, therefore, a single automaton is generated that includes a hierarchy retrieval automaton configured by using a partial path schema extracted by the extracting process (step S2601) and the keyword retrieval automaton 502.

Likewise, the extracting process is also executed from steps S909 to S910 (step S2602). The extracting process (step S2602) is also executed by the determining unit 1602 and the extracting unit 1601. As a result, in converted-single-automaton generation at step S910, a converted single automaton is generated that includes a converted hierarchy retrieval automaton configured by using a converted partial path schema extracted by the extracting process (step S2602) and the keyword retrieval automaton 502.

Figure 27:
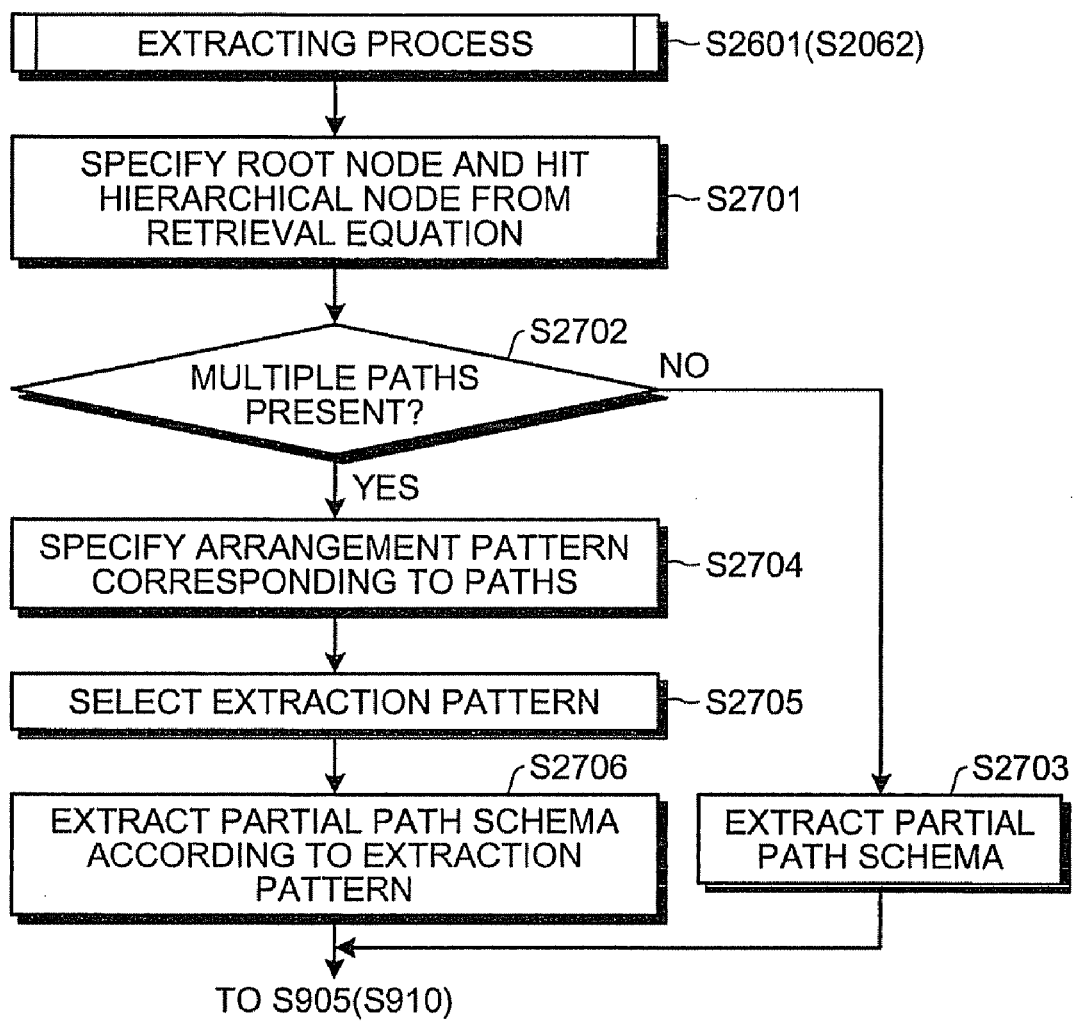
FIG. 27 is a flowchart of the extracting process (steps S2601, S2602)

FIG. 27 is a flowchart of the extracting process (step S2601, step S2602). As depicted in FIG. 27, a root node and a hit hierarchical node are specified from a retrieval equation (step S2701), and whether multiple paths specified by the retrieval equation are present is determined (step S2702).

When multiple paths are not present (step S2702: NO), a partial path schema (or converted partial path schema) specified by a single path is extracted from a path schema (converted path schema), as depicted in FIG. 12 (step S2703). The procedure then proceeds to step S905 (S910).

When multiple paths are present (step S2702: YES), an arrangement pattern corresponding to the paths is specified (step S2704), and an extraction pattern is selected (step S2705). The extraction pattern may be selected randomly or in a preferential order.

Subsequently, a partial path schema (or converted partial path schema) is extracted from a path schema (converted path schema) according to the selected extraction pattern (step S2706), after which the procedure proceeds to step S905 (S910), ending a series of the processing.

A wild card is a special symbol that matches any pattern during retrieval. With the wild card, two retrieval ranges are specified depending on how a retrieval equation is contracted. The wild card is expressed as "//" in a retrieval equation.

Figure 28:
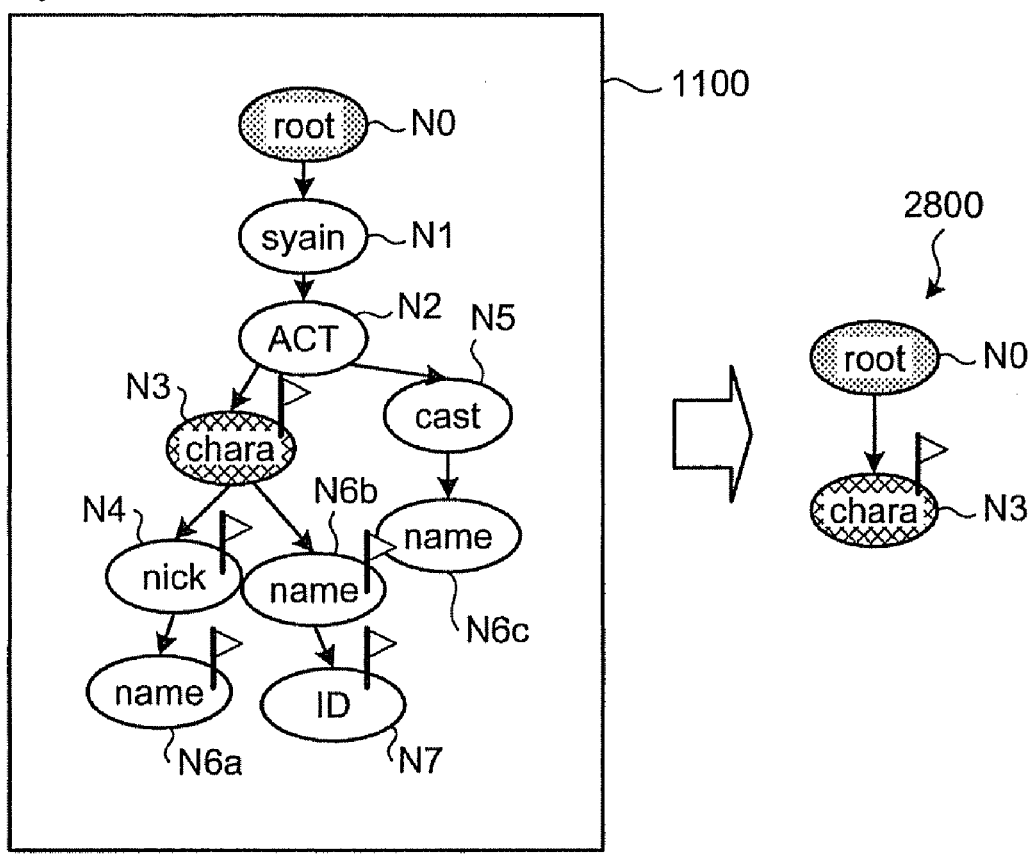
FIG. 28 is an explanatory diagram of a third example of extraction of a partial path schema.

For a retrieval equation in which a wild card is written at the end of the equation, such as "X//", the hierarchical node having a hierarchical name "X" is selected as a hit hierarchical node. FIG. 28 is an explanatory diagram of a third example of extraction of a partial path schema. In the example of the path schema 1100 depicted in FIG. 11, for example, a partial path schema 2800 that includes the root node N0 and the hit hierarchical node N3 may be extracted when retrieval equation (4) is given, thereby enabling size reduction. Hierarchical nodes with raised flags are hierarchical nodes to be retrieved.

/syain/ACT/chara// (4)

Figure 29:
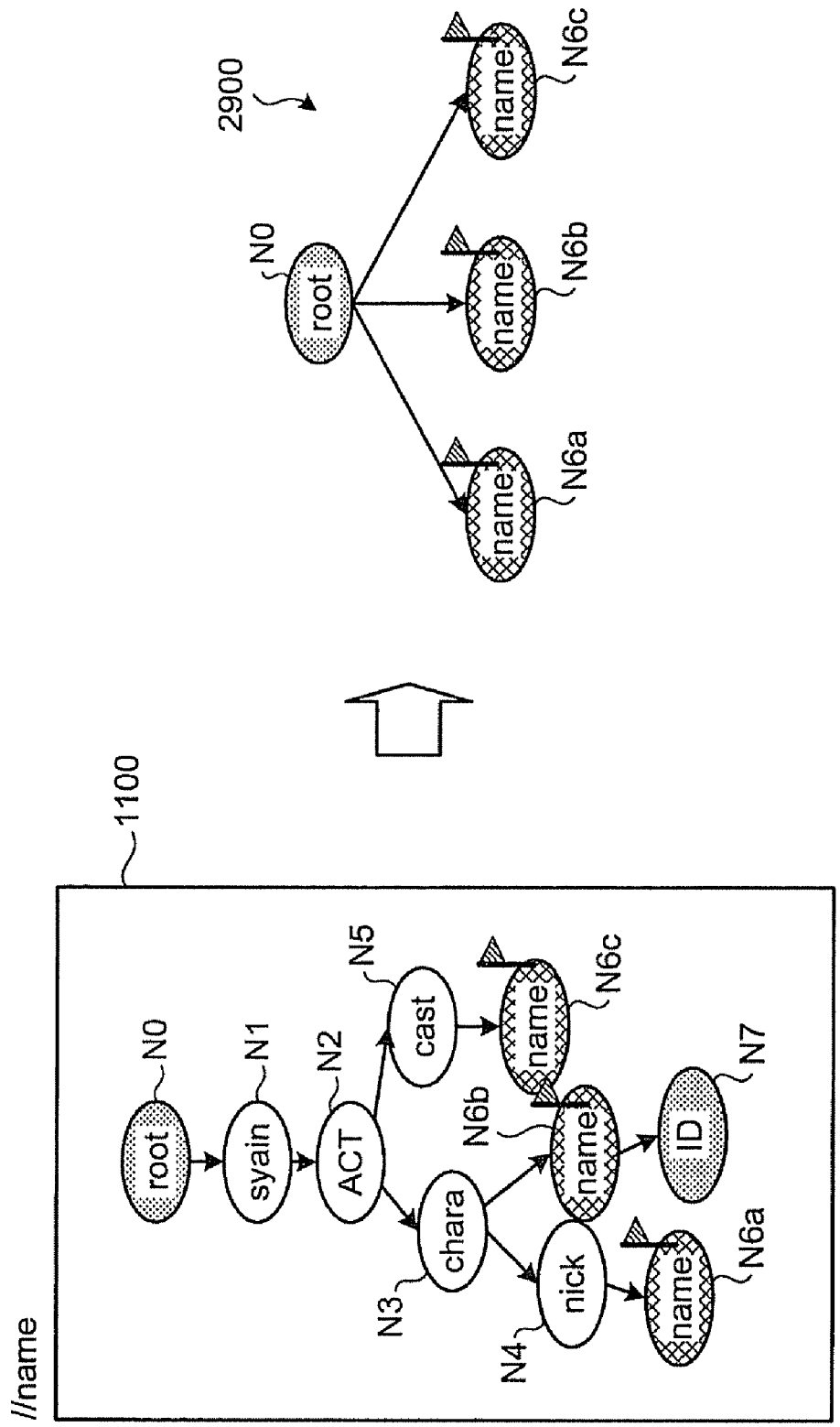
FIG. 29 is an explanatory diagram of a fourth example of extraction of a partial path schema.

For a retrieval equation in which a wild card is not written at the end of the equation but written as "//X", a hierarchical node and a child hierarchical node to the hierarchical node are selected, which are derived by a path pruning method disclosed in "Proposal of XQuery Processing Using Deterministic Finite Automaton by Path Pruning", by Ishino, et al. FIG. 29 is an explanatory diagram of a fourth example of extraction of a partial path schema. In the example of the path schema 1100 depicted in FIG. 11, for example, a partial path schema 2900 that includes the root node N0 and the hit hierarchical node N6 (N6a, N6b, N6c) may be extracted when retrieval equation (5) is given. Hierarchical nodes with raised flags are hierarchical nodes to be retrieved.

//name (5)

Multiple retrieval equations are given in some cases. In such a case, a hit hierarchical node and a child hierarchical node of the hit hierarchical node are specified so that nodes acquired from all retrieval equations are covered. For example, the logical sum of the retrieval equations is calculated to extract a partial path schema.

Figure 30:
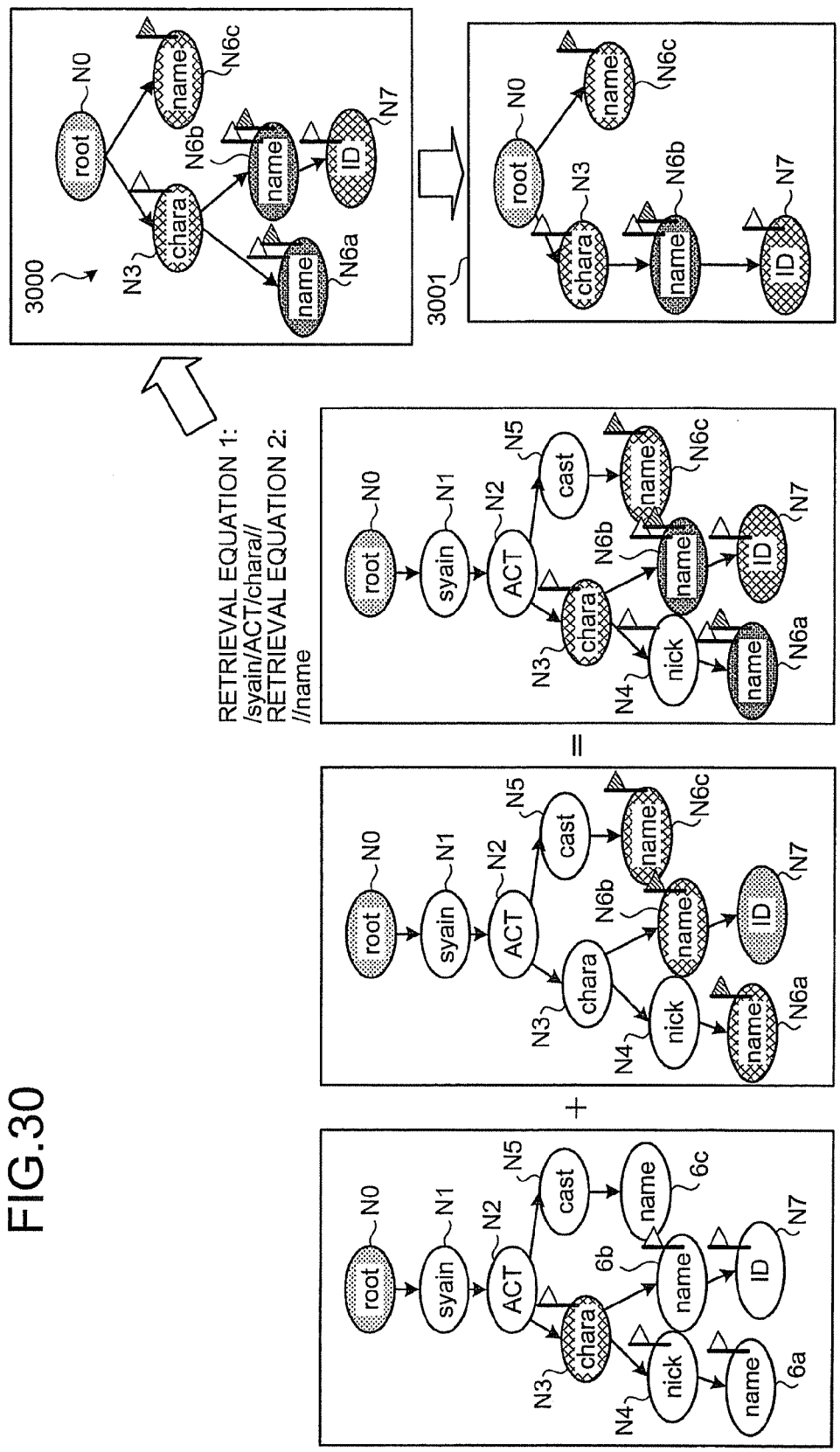
FIG. 30 is an explanatory diagram of a fifth example of extraction of a partial path schema.

FIG. 30 is an explanatory diagram of a fifth example of extraction of a partial path schema. The example depicted in FIG. 30 is an example of extraction when retrieval equations (4) and (5) are given. In this case, a partial path schema 3000 that includes the root node N0 and the hit hierarchical nodes N3, N6 (N6a, N6b, N6c) may be extracted, thereby enabling size reduction. Hierarchical nodes with raised flags are hierarchical nodes to be retrieved.

Because the hit hierarchical nodes N6a and N6b are branch destination nodes branching from the hierarchical node N3, two branching paths from both nodes may be integrated into one path. For example, the hit hierarchical nodes N6a and N6b are degenerated into the hit hierarchical node N6b having a child hierarchical node. A partial path schema 3001 is thus provided as a degenerated partial path schema, thereby enabling further size reduction.

According to the second embodiment, a partial path schema serving as a path tree along which a path starts from a root node to definitely reach a hit hierarchical node in a unique manner is extracted from a path schema. As a result, the origin of generation of a hierarchy retrieval automaton may be narrowed down to a partial path schema composed of fewer nodes. The size of a hierarchy retrieval automaton in a generated single automaton, therefore, may be reduced.

A reduction in the size of the hierarchy retrieval automaton enables a reduction in the capacity of a memory in which the single automaton is saved. As a result, when the processor carries out processing, the memory size is reduced, which may be expected to lower the cache miss rate, and thus, increase retrieval speed. A reduction in the size of the hierarchy retrieval automaton leads to a reduction in the frequency of state transition, thereby lowering the cache miss rate and increasing retrieval speed.

In the first embodiment, the number of nodes in the hierarchy retrieval automaton is reduced by converting each of hierarchical names in the electronic document into a unique character string using the conversion table 600 depicted in FIG. 6. In a third embodiment, the number of nodes in the hierarchy retrieval automaton is reduced by assigning a tag symbol and a unique identifier to each path in a path schema.

For example, for the path schema 1100 depicted in FIG. 11, there are three paths that lead to hierarchical nodes, which have the hierarchical name "name" and are regarded as hit hierarchical nodes. In this case, a different identifier is assigned to each path, so that a path may be identified by detecting the identifier at the time of reading in the electronic document. Constituent elements identical to those depicted in FIGS. 1 and 2 will be denoted by similar reference numerals used in FIGS. 1 and 2, and further description will be omitted.

FIG. 31 is an explanatory diagram of a path ID table 3100. As depicted in FIG. 31, a path ID is assigned to each path in the path ID table 3100, which is generated when the electronic document is read in.

For example, when a path with no path ID assigned thereto is detected in the path ID table 3100, a unique path ID is assigned to the detected path. Meanwhile, when a path with a path ID assigned thereto is detected, a tag in the electronic document is converted.

When a document to be searched is an XML document, the start tag symbol is converted from "< ... >" to "[ ... ", and the end tag symbol is converted from "</ ... >" to "/ ... ". This conversion process is carried out by the converting unit 407 depicted in FIG. 4. The tag symbol "[" is referred to as hierarchy start indicator, while the tag symbol "/" is referred to as hierarchy end indicator.

FIG. 32 is an explanatory diagram of a first example of conversion into a path ID. In FIG. 32, reference numeral 3201 denotes an XML document before conversion, and reference numeral 3202 denotes the converted XML document.

Figure 33:
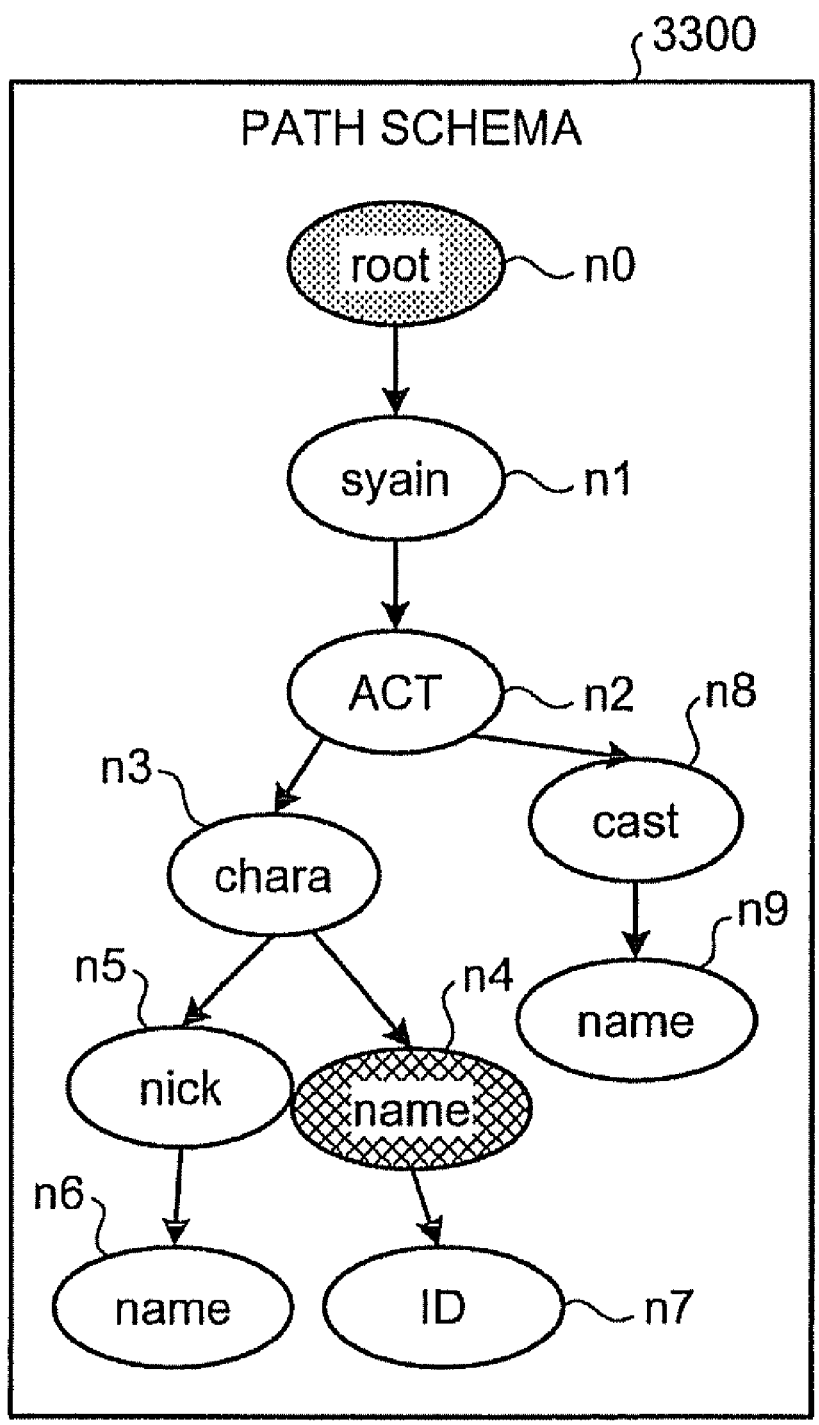
FIG. 33 is an explanatory diagram of a converted path schema.

FIG. 33 is an explanatory diagram of a converted path schema. A converted path schema 3300 is a path schema generated from the converted XML document 3202 depicted in FIG. 32. In this path schema, reference numeral "n#" is assigned to each hierarchical node, where # denotes a path ID. Accordingly, multiple nodes having a similar hierarchical name "name", such as the hierarchical nodes N6 (N6a, N6b, and N6c) depicted in FIG. 11, are not depicted in FIG. 33, but rather the hierarchical nodes having a similar hierarchical name "name" are each denoted by n4, n6, and n9 to distinguish one from another.

FIG. 34 is an explanatory diagram of a sixth example of extraction of a partial path schema. As depicted in FIG. 34, when retrieval equation (6) is given, a converted partial path schema 3400 may be extracted from the converted path schema 3300. Comparison of the sixth extraction example and the extraction example of FIG. 14 resulting from a similar retrieval equation reveals that the number of nodes is further reduced in the sixth extraction example.

/syain/ACT/chara/name/ (6)

Figure 35:
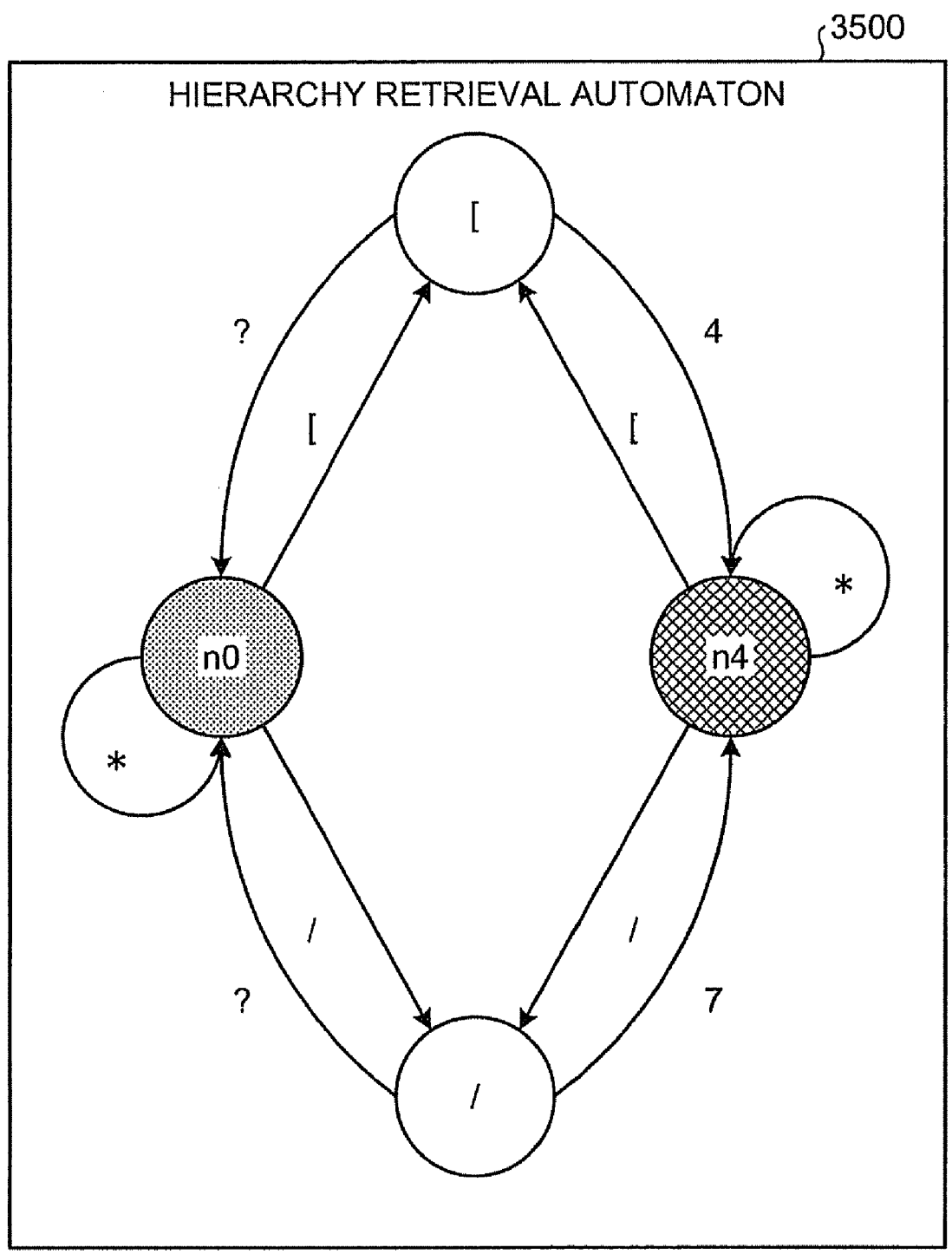
FIG. 35 is an explanatory diagram of a hierarchy retrieval automaton acquired from the converted partial path schema.

FIG. 35 is an explanatory diagram of a hierarchy retrieval automaton acquired from the converted partial path schema 3400. As depicted in FIG. 35, the hierarchy retrieval automaton 3500 includes the hierarchical nodes n0 and n4 making up the converted partial path schema 3400, a node representing the hierarchy start indicator "[", and a node representing the hierarchy end indicator "/". Comparison of the hierarchy retrieval automaton 3500 and the hierarchy retrieval automaton 1501 of FIG. 15 reveals a reduction in the number of nodes in the hierarchy retrieval automaton 3500.

In the hierarchy retrieval automaton 3500, when state transition has been made to the root node n0, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the root node n0.

In the hierarchy retrieval automaton 3500, when state transition has been made to the hit hierarchical node n4, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the hit hierarchical node n4.

In the hierarchy retrieval automaton 3500, when state transition has been made to the node representing the hierarchy start indicator "[", giving an identifier "4" results in state transition to the hit hierarchical node n4, while giving an identifier other than the identifier "4" (denoted by "?" in FIG. 35) results in state transition to the root node n0.

The identifier "7" of a child hierarchical node n7 to the hit hierarchical node n4 is embedded in a hit hierarchical node n469. Consequently, in the hierarchy retrieval automaton 3500, when state transition has been made to the node representing the hierarchy end indicator "/", giving the identifier "7" results in state transition to the hit hierarchical node n4, while giving an identifier other than the identifier "7" (denoted by "?" in FIG. 35) results in state transition to the root node n0.

Hence, the capacity of the memory having the single automaton saved therein may be reduced. As a result, when the processor carries out processing, the memory size is reduced, which may be expected to lower the cache miss rate and thus, increase retrieval speed. A reduction in the size of the hierarchy retrieval automaton leads to a reduction in the frequency of state transition, thereby lowering the cache miss rate and increasing retrieval speed.

Figure 36:
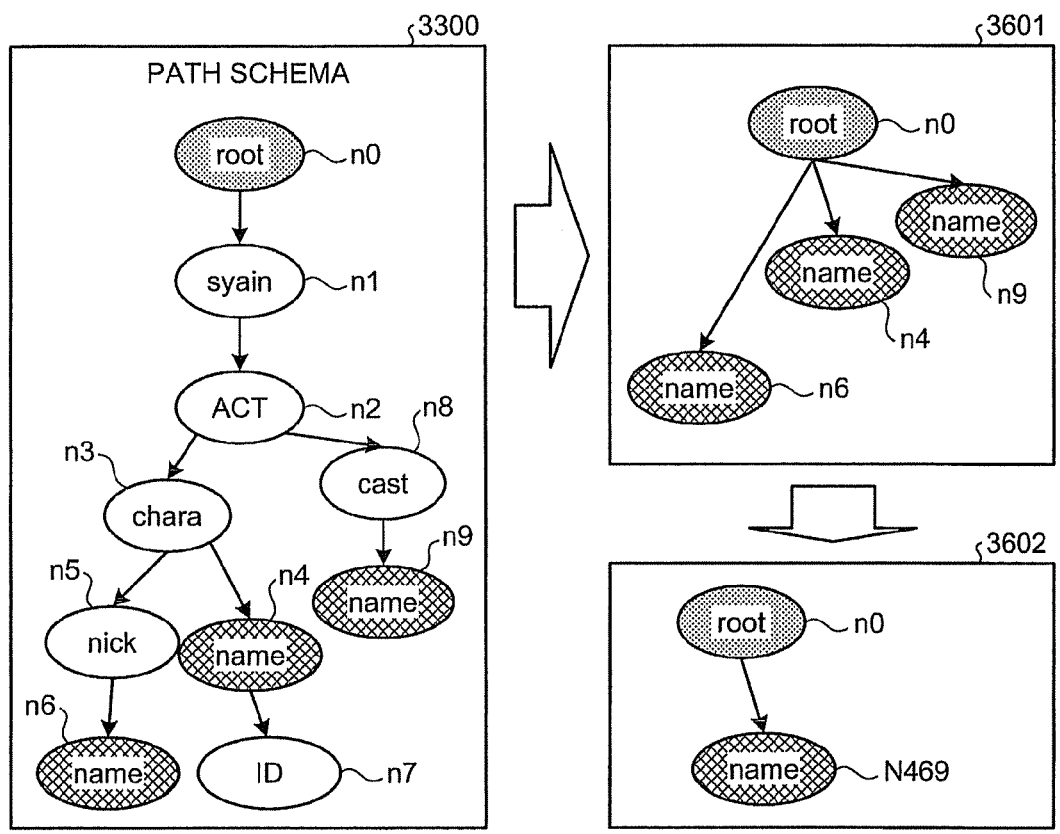
FIG. 36 is an explanatory diagram of a seventh example of extraction of a partial path schema.

With respect to wild card retrieval, multiple paths may be selected. FIG. 36 is an explanatory diagram of a seventh example of extraction of a partial path schema. In FIG. 36, for example, when retrieval equation (7) is given, a converted partial path schema 3601 that includes the root node n0 and hit hierarchical nodes n4, n6, and n9 may be extracted from the converted path schema 3300.

Because these hit hierarchical nodes n4, n6, and n9 have a similar hierarchical name, the hit hierarchical nodes n4, n6, and n9 are degenerated to acquire a converted partial path schema 3602. The hit hierarchical node n469 resulting from the degeneration is the node that has embedded therein the identifiers "4", "6", and "9" of the hit hierarchical nodes n4, n6, and n9 and the identifier "7" of the child hierarchical node n7 to the hit hierarchical node n4.

Figures 37, 38:
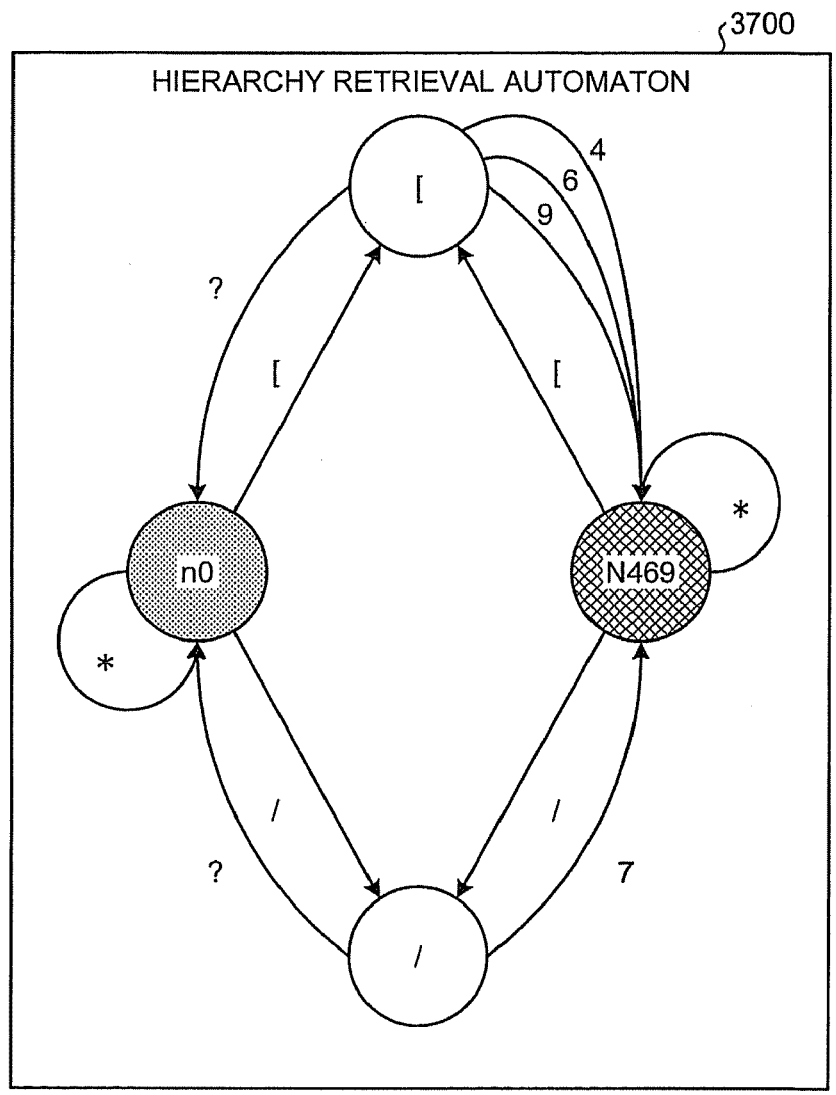
FIG. 37 is an explanatory diagram of a hierarchy retrieval automaton acquired from a converted partial path schema.
FIG. 38 is an explanatory diagram of an example of conversion of multiple retrieval equations.

FIG. 37 is an explanatory diagram of a hierarchy retrieval automaton acquired from the converted partial path schema 3602. As depicted in FIG. 37, the hierarchy retrieval automaton 3700 includes the hierarchical nodes n0 and n469 making up the converted partial path schema 3602, a node representing the hierarchy start indicator "[", and a node representing the hierarchy end indicator "/". Comparison of the hierarchy retrieval automaton 3700 and the hierarchy retrieval automaton 1501 of FIG. 15 reveals a reduction in the number of nodes in the hierarchy retrieval automaton 3700.

In the hierarchy retrieval automaton 3700, when state transition has been made to the root node n0, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the root node n0.

In the hierarchy retrieval automaton 3700, when state transition has been made to the hit hierarchical node n469, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the hit hierarchical node n469.

The identifiers "4", "6", and "9" of the hit hierarchical nodes n4, n6, and n9 are embedded in the hit hierarchical node n469. Consequently, in the hierarchy retrieval automaton 3700, when state transition has been made to the node representing the hierarchy start indicator "[", giving the identifiers "4", "6", or "9" results in state transition to the hit hierarchical node n469, while giving an identifier other than the identifier "469" (denoted by "?" in FIG. 37) results in state transition to the root node n0.

The identifier "7" of a child hierarchical node n7 of the hit hierarchical node n4 is embedded in a hit hierarchical node n469. Consequently, in the hierarchy retrieval automaton 3700, when state transition has been made to the node representing the hierarchy end indicator "/", giving the identifier "7" results in state transition to the hit hierarchical node n469, while giving an identifier other than the identifier "7" (denoted by "?" in FIG. 37) results in state transition to the root node n0.

In this example of wild card retrieval, a path schema may be degenerated before generation of a single automaton, thereby enabling a reduction in the capacity of the memory having the single automaton saved therein. As a result, when the processor carries out processing, the memory size is reduced, which may be expected to lower the cache miss rate and thus, increase retrieval speed. A reduction in the size of the hierarchy retrieval automaton leads to a reduction in the frequency of state transition, thereby lowering the cache miss rate and increasing retrieval speed.

When multiple retrieval equations are given, a hit hierarchical node and a child hierarchical node to the hit hierarchical node are specified so that nodes acquired from all retrieval equations are covered. For example, the logical sum of the retrieval equations is calculated to extract a converted partial path schema.

FIG. 38 is an explanatory diagram of an example of conversion of multiple retrieval equations. When a retrieval equation K1=/syain/ACT/chara// and a retrieval equation K2=// name are given, the retrieval equations K1 and K2 are converted into retrieval equations Q1 and Q2, which are expressed by converting hierarchical names in the retrieval equations K1 and K2 into symbol strings each consisting of the hierarchy start indicator "[" and a unique identifier and connecting the symbol strings by logical sum (denoted by "or" in FIG. 38).

From the retrieval equations Q1 and Q2, a retrieval equation Q2&Q1 is generated by calculating the logical product (denoted by "&" in FIG. 38) of the retrieval equations Q1 and Q2. In this case, symbol strings [4 and [6 included in the retrieval equation Q2&Q1 are deleted from the retrieval equations Q1 and Q2. Hence, one symbol string is selected from each of the three retrieval equations Q1, Q2, and Q2&Q1 to extract a converted partial path schema.

Figure 39:
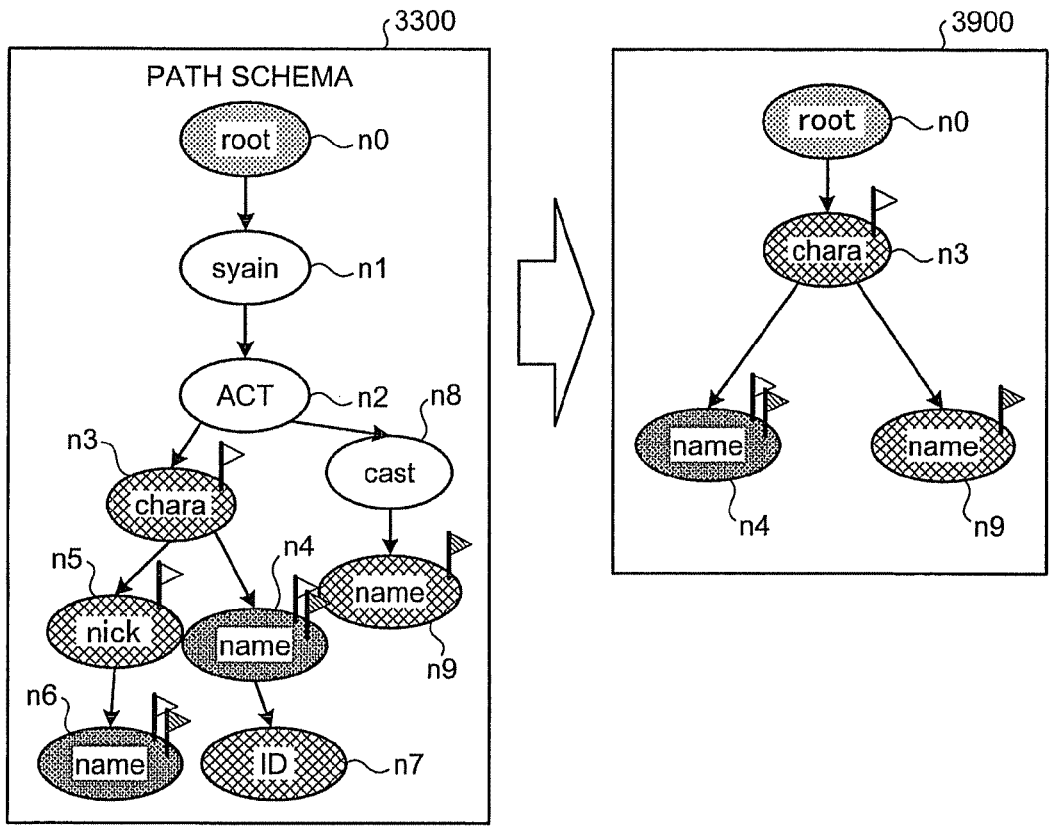
FIG. 39 is an explanatory diagram of an eighth example of extraction of a partial path schema.

FIG. 39 is an explanatory diagram of an eighth example of extraction of a partial path schema. In FIG. 39, when symbol strings [3, [4, and [9 are selected from the three retrieval equations Q1, Q2, and Q2&Q1, respectively, a converted partial path schema 3900 is extracted.

Unselected symbol strings are embedded in hierarchical nodes of the symbol strings selected from the three retrieval equations Q1, Q2, and Q2&Q1. For example, symbol strings [3, [5, and [7 are embedded in the hit hierarchical node n3 to specify a destination of transition from a node representing the hierarchy start indicator "[".

Because the hit hierarchical node n3 has the child hierarchical nodes n4 and n5, symbol strings [4 and [5 are also embedded in the hit hierarchical node n3 as a destination of transition from a node representing the hierarchy end indicator "/". Because the child hierarchical node n5 is not a hit hierarchical node, the symbol string [6 of the hit hierarchical node n6 that is a child hierarchical node to the hierarchical node n5 is also embedded in the hit hierarchical node n3 as a destination of transition from a node representing the hierarchy end indicator "/".

The symbol string [9 is embedded in the hit hierarchical node n9 to specify a destination of transition from a node representing the hierarchy start indicator "[". The symbol strings [4 and [6 are embedded in the hit hierarchical node n4 to specify a destination of transition from a node representing the hierarchy start indicator "[". Because the hit hierarchical node n4 has the child hierarchical node n7, the symbol string [7 is also embedded in the hit hierarchical node n4 as a destination of transition from a node representing the hierarchy end indicator "/".

Figure 40:
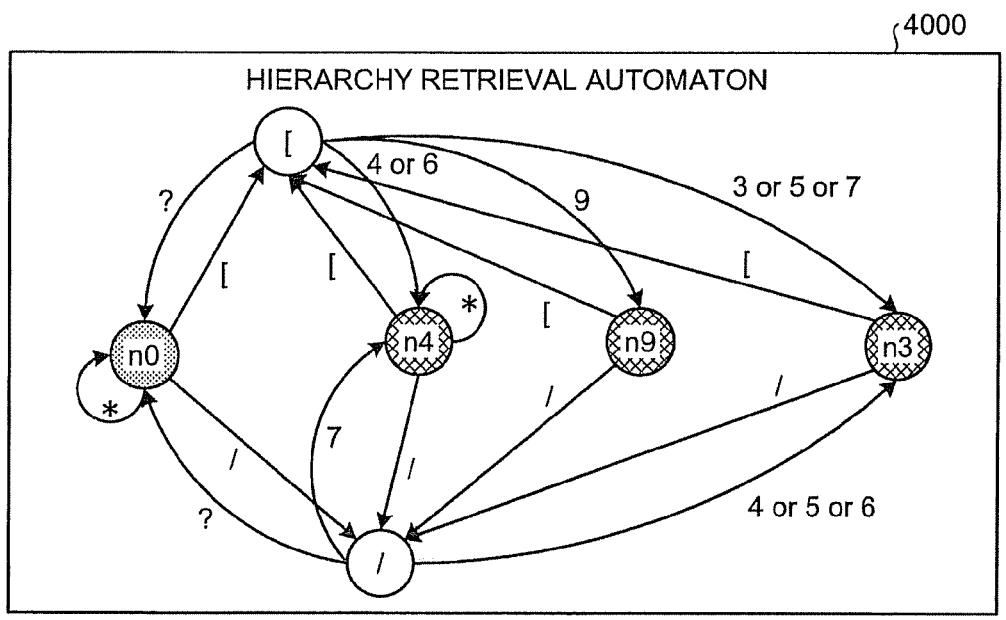
FIG. 40 is an explanatory diagram of a hierarchy retrieval automaton acquired from a converted partial path schema.

FIG. 40 is an explanatory diagram of a hierarchy retrieval automaton acquired from the converted partial path schema 3900. As depicted in FIG. 40, the hierarchy retrieval automaton 4000 includes the hierarchical nodes n0, n3, n4, and n9 making up the converted partial path schema 3900, a node representing the hierarchy start indicator "[", and a node representing the hierarchy end indicator "/".

In the hierarchy retrieval automaton 4000, when state transition has been made to the root node n0, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the root node n0.

In the hierarchy retrieval automaton 4000, when state transition has been made to the hit hierarchical node n4, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the hit hierarchical node n4.

In the hierarchy retrieval automaton 4000, when state transition has been made to the hit hierarchical node n9, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the hit hierarchical node n9.

In the hierarchy retrieval automaton 4000, when state transition has been made to the hit hierarchical node n3, giving the hierarchy start indicator "[" results in state transition to the node representing the hierarchy start indicator "[", while giving the hierarchy end indicator "/" results in state transition to the node representing hierarchy end indicator "/". When a character other than a tag symbol is given, state transition is made to the hit hierarchical node n3.

The identifier "6" of the hit hierarchical node n6 is embedded in the hit hierarchical node n4. Consequently, in the hierarchy retrieval automaton 4000, when state transition has been made to the node representing the hierarchy start indicator "[", giving the identifier "4" or "6" results in state transition to the hit hierarchical node n4.

The identifier "3", "5", and "7" of the hit hierarchical nodes n3, n5, n7 are embedded in the hit hierarchical node n3. Consequently, when state transition has been made to the node representing the hierarchy start indicator "[", giving the identifier "3", "5", or "7" results in state transition to the hit hierarchical node n3.

Similarly, the identifier "9" of the hit hierarchical nodes n9 is embedded in the hit hierarchical node n9. Consequently, when state transition has been made to the node representing the hierarchy start indicator "[", giving the identifier "9" results in state transition to the hit hierarchical node n9.

When state transition has been made to a node representing the hierarchy start indicator "[", if an identifier other than the identifier "9" (denoted by "?" in FIG. 40) is given, state transition is made to the root node n0.

The identifier "7" of the child hierarchical node n7 is embedded in the hit hierarchical node n4. Consequently, in the hierarchy retrieval automaton 4000, when state transition has been made to the node representing the hierarchy end indicator "/", giving the identifier "7" results in state transition to the hit hierarchical node n4.

The identifier "4", "5", and "6" of the hit hierarchical nodes n4, n5, n6 are embedded in a hit hierarchical node n4. Consequently, in the hierarchy retrieval automaton 4000, when state transition has been made to the node representing the hierarchy end indicator "/", giving the identifier "4", "5", or "6" results in state transition to the hit hierarchical node n3.

When state transition has been made to a node representing the hierarchy end indicator "/", if an identifier other than the identifier "/" (denoted by "?" in FIG. 40) is given, state transition is made to the root node n0.

Accordingly, in this example of when multiple retrieval equations are given, a path schema may be degenerated before generation of a single automaton, thereby enabling a reduction in the capacity of the memory having the single automaton saved therein. As a result, when the processor carries out processing, the memory size is reduced, which may be expected to lower the cache miss rate and thus, increase retrieval speed. A reduction in the size of the hierarchy retrieval automaton leads to a reduction in the frequency of state transition, thereby lowering the cache miss rate and increasing retrieval speed.

An example where hierarchical indicators are not distinguished as an indicator for the start tag and an indicator for the end tag, but are expressed as identical symbols will be described. For example, the hierarchy end indicator "/" becomes the hierarchy start indicator "[", and an identifier serving as a parent identifier to an identifier for an in-tag character string is adopted.

Figure 41:
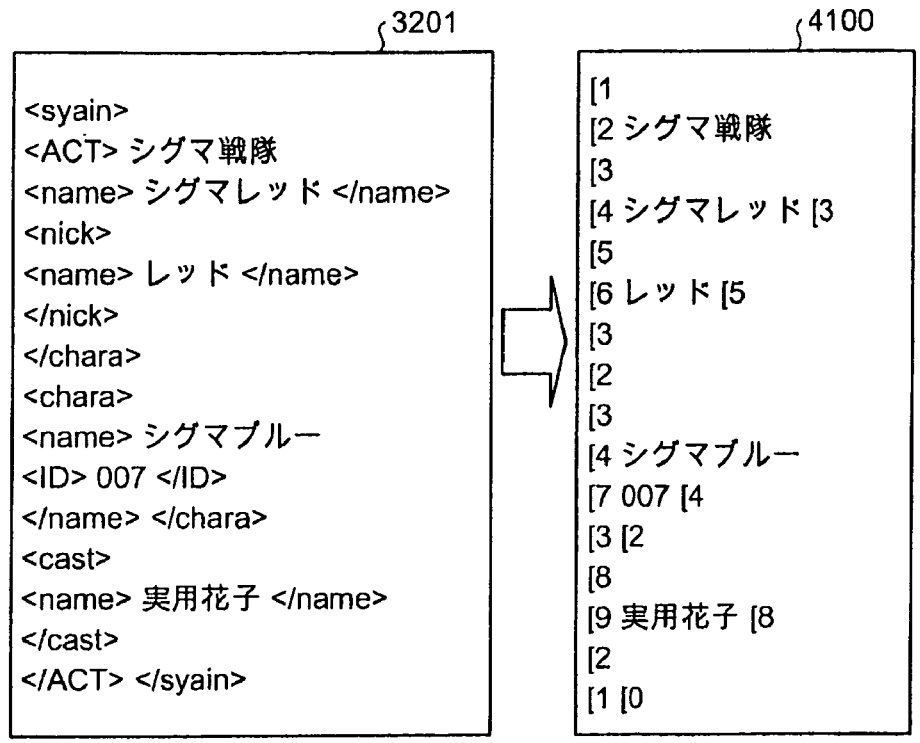
FIG. 41 is an explanatory diagram of a second example of conversion to a path ID.

FIG. 41 is an explanatory diagram of a second example of conversion to a path ID. In FIG. 41, reference numeral 3201 denotes an XML document before conversion, while reference numeral 4100 denotes the converted XML document. With respect to the fourth line of the XML document 4100, the end tag has been converted into a symbol string "[3" consisting of the hierarchy start indicator "[" and the identifier "3" that is a parent identifier to the identifier "4" embedded in the start tag. Other tags are also converted in a similar manner. The converted partial path schema that results is similar to the converted partial path schema depicted in FIG. 34.

Figure 42:
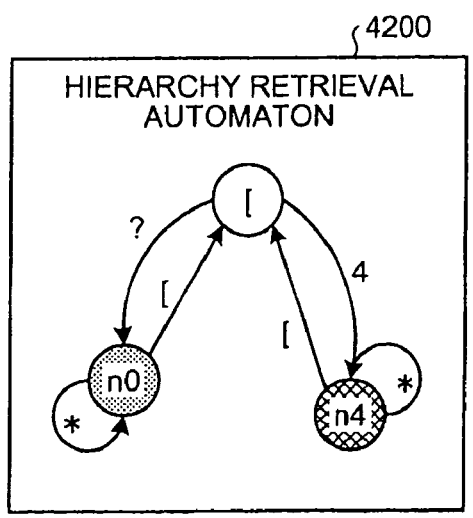
FIG. 42 is an explanatory diagram of a hierarchy retrieval automaton of an example where hierarchical indicators are not distinguished for the start tag and the end tag.

FIG. 42 is an explanatory diagram of a hierarchy retrieval automaton of the example where hierarchical indicators are not distinguished for the start tag and the end tag. As depicted in FIG. 42, the hierarchy retrieval automaton 4200 includes the root node n0, the hit hierarchical node n4, and a node representing the hierarchy start indicator "[". Comparison of the hierarchy retrieval automaton 4200 and the hierarchy retrieval automaton 3500 depicted in FIG. 35 reveals that the size of the hierarchy retrieval automaton is reduced by deleting a node representing the hierarchy end indicator "/".

In the hierarchy retrieval automaton 4200, when state transition has been made to the root node n0, giving the hierarchy start indicator "[" results in state transition to the node representing the hierarchy start indicator "[". When a character other than the hierarchy start indicator "[" is given, state transition is made to the root node n0.

In the hierarchy retrieval automaton 4200, when state transition has been made to the hit hierarchical node n4, giving the hierarchy start indicator "[" results in state transition to the node representing the hierarchy start indicator "[". When a character other than the hierarchy start indicator "[" is given, state transition is made to the hit hierarchical node n4.

In the hierarchy retrieval automaton 4200, when state transition has been made to the node representing the hierarchy start indicator "[", giving an identifier "4" results in state transition to the hit hierarchical node n4, while giving an identifier other than the identifier "4" (denoted by "?" in FIG. 42) results in state transition to the root node n0.

In this example where hierarchical indicators are not distinguished for the start tag and the end tag, a path schema may be degenerated before generation of a single automaton, thereby enabling a reduction in the capacity of the memory having the single automaton saved therein. As a result, when the processor carries out processing, the memory size is reduced, which may be expected to lower the cache miss rate and thus, increase retrieval speed. A reduction in the size of the hierarchy retrieval automaton leads to a reduction in the frequency of state transition, thereby lowering the cache miss rate and increasing retrieval speed.

Figure 43:
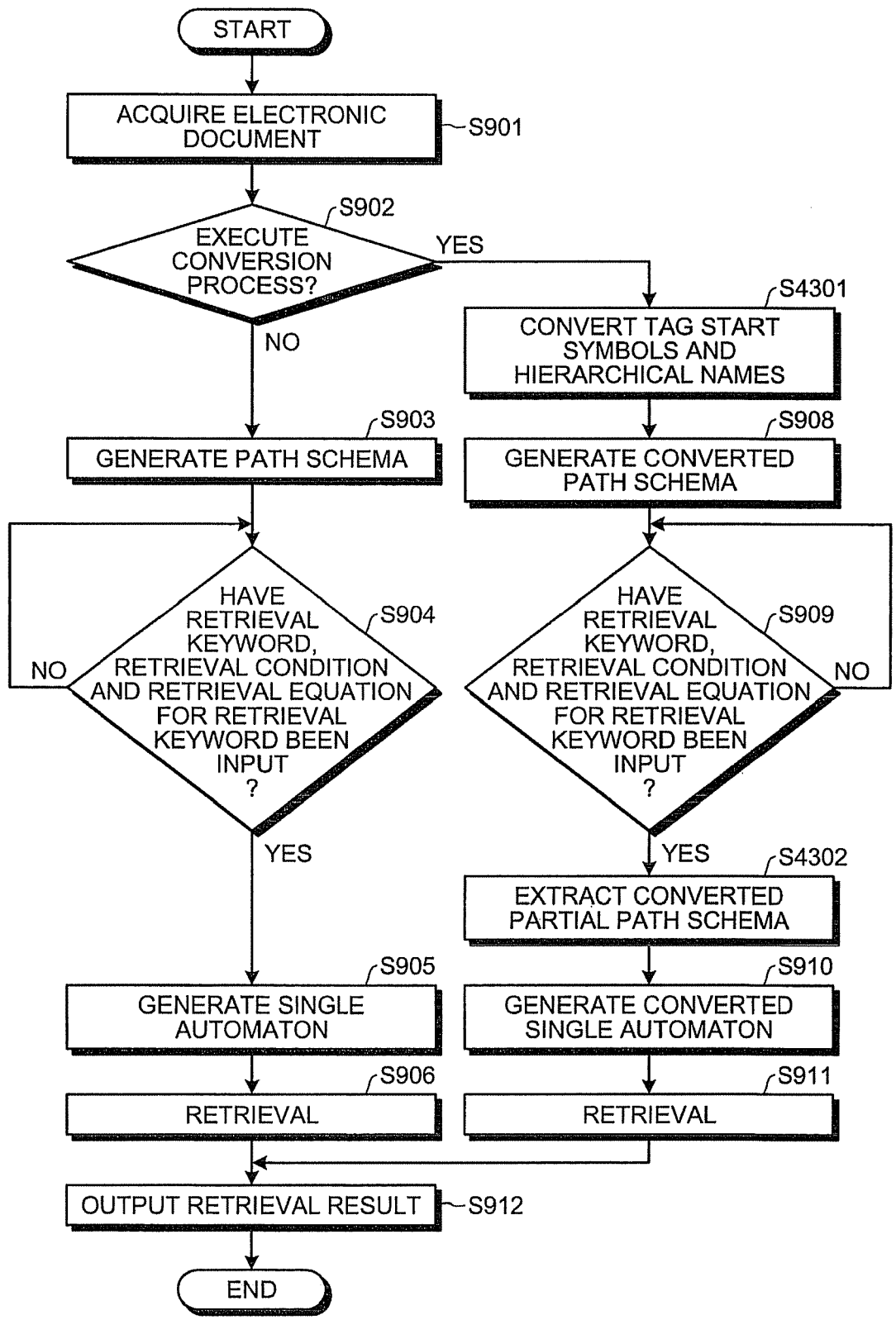
FIG. 43 is a flowchart of an information retrieving procedure according to a third embodiment.

FIG. 43 is a flowchart of an information retrieving procedure according to the third embodiment. In FIG. 43, processing identical to that depicted in FIG. 9 will be denoted by similar reference numerals used in FIG. 9, and further description will be omitted.

As depicted in FIG. 43, after step S902: YES, the converting unit 407 converts tag start symbols and hierarchical names, using the path ID table 3100 (step S4301). As a result, the converted XML documents 3202 and 4100 of FIGS. 32 and 41 are obtained, and the converted path schema 3300 of FIG. 33 is generated (step S908).

After step S909, a converted partial path schema is extracted from the converted path schema 3300 (step S4302). In this case, the converted partial path schemata 3400, 3602, and 3900 are extracted, as depicted in FIGS. 34, 36, and 39.

At step S910, therefore, converted single automatons having converted hierarchy retrieval automatons 3500, 3700, 4000, and 4200 are generated, as depicted in FIGS. 35, 37, 40, and 42 (step S910).

In this manner, according to the third embodiment, the number of nodes in a hierarchy retrieval automaton may be reduced by assigning a tag symbol and a unique identifier to each of paths in a path schema.

Hence, the capacity of the memory having the single automaton saved therein may be reduced. As a result, when the processor carries out processing, the memory size is reduced, which may be expected to lower the cache miss rate and thus, increase retrieval speed. A reduction in the size of the hierarchy retrieval automaton leads to a reduction in the frequency of state transition, thereby lowering the cache miss rate and increasing retrieval speed.

As described, according to the present embodiments, an effect of improved retrieval speed by reducing overheads between the hierarchy retrieval automation and the keyword retrieval automation is realized.

The information retrieving method explained in the present embodiment may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

The information retrieving apparatus 100 described in the present embodiment may be realized by an application specific integrated circuit (ASIC) such as a standard cell or a structured ASIC, or a programmable logic device (PLD) such as a field-programmable gate array (FPGA). For example, the functional configuration (the reference numeral of each functional block) of the information retrieving apparatus 100 is defined in hardware description language (HDL), which is logically synthesized and applied to the ASIC, the PLD, etc., thereby enabling manufacture of the information retrieving apparatus 100.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable recording medium storing therein an information retrieving program that causes a computer to execute:

acquiring a document to be searched and having a hierarchical structure;

generating a path schema related to the acquired document;

receiving input of a retrieval keyword, a retrieval condition for the retrieval keyword, and a retrieval equation specifying a retrieval range for the retrieval keyword;

generating a single automaton that includes a hierarchy retrieval automaton that retrieves a hierarchy of the generated path schema and a hit keyword retrieval automaton that retrieves a hit keyword satisfying the input retrieval condition for the retrieval keyword, the single automaton making state transition between a hit hierarchical node at which the hit keyword in the hierarchy retrieval automaton is present and a set of nodes representing the hit keyword;

retrieving, from the document and using the generated single automaton, the hit keyword within the retrieval range; and outputting a retrieval result obtained at the retrieving.

2. The computer-readable recording medium according to claim 1, wherein the hierarchy retrieval automaton has a node representing a start symbol of a start tag between a superior hierarchical node as a transition origin and a subordinate hierarchical node as a transition destination for the superior hierarchical node, and if the start symbol is given when state transition has been made to the superior hierarchical node, the hierarchy retrieval automaton makes state transition to the node representing the start symbol.

3. The computer-readable recording medium according to claim 2, wherein the hierarchy retrieval automaton has a series of nodes representing the hierarchical name of the subordinate hierarchical node between the node representing the start symbol and the subordinate hierarchical node, and if a character string is given when state transition has been made to the node representing the start symbol, the hierarchy retrieval automaton makes state transition to the series of nodes until a hit-missing character appears.

4. The computer-readable recording medium according to claim 3, wherein the hierarchy retrieval automaton makes state transition to the superior hierarchical node, when a hit-missing character appears.

5. The computer-readable recording medium according to claim 3, wherein the hierarchy retrieval automaton makes state transition to the subordinate hierarchical node, if an end symbol of the start tag is given when state transition has been made to an end node of the series of nodes.

6. The computer-readable recording medium according to claim 5, wherein
the hierarchy retrieval automaton has a series of nodes representing the hierarchical name of the subordinate hierarchical node between the node representing the start symbol and the superior hierarchical node, and if a character string is given when state transition has been made to the node representing the start symbol, the hierarchy retrieval automaton makes state transition to the series of nodes until a hit-missing character appears.

7. The computer-readable recording medium according to claim 6, wherein the hierarchy retrieval automaton makes state transition to the subordinate hierarchical node, when a hit-missing character appears.

8. The computer-readable recording medium according to claim 6, wherein the hierarchy retrieval automaton makes state transition to the superior hierarchical node, if an end symbol of the start tag is given when state transition has been made to the last node of the series of nodes.

9. The computer-readable recording medium according to claim 2 and storing therein the information retrieving program that causes the computer to further execute:
converting the hierarchical name of each hierarchical node making up the path schema into a unique character string, wherein
the generating of the single automaton includes generating the single automaton by using the converted unique character string to form the hierarchy retrieval automaton, and
the hierarchy retrieval automaton has a series of nodes between the node representing the start symbol and the subordinate hierarchical node, and if a character string is given when state transition has been made to the node representing the start symbol, the hierarchy retrieval automaton makes state transition to the series of nodes until a hit-missing character appears, the series of nodes representing the unique character string converted from the hierarchical name of the subordinate hierarchical node.

10. The computer-readable recording medium according to claim 9, wherein the unique character string has fewer characters than the hierarchical name has.

11. The computer-readable recording medium according to claim 1, wherein the hierarchy retrieval automaton has a node representing a start symbol of an end tag between a subordinate hierarchical node as a transition origin and a superior hierarchical node as a transition destination for the subordinate hierarchical node, and if the start symbol is given when state transition has been made to the subordinate hierarchical node, the hierarchy retrieval automaton makes state transition to the node representing the start symbol.

12. The computer-readable recording medium according to claim 11 and storing therein the information retrieving program that causes the computer to further execute:
converting a hierarchical name in the document into a unique character string, wherein
the generating of the single automaton includes generating the single automaton by using the converted unique character string to form the hierarchy retrieval automaton, and
the hierarchy retrieval automaton has a series of nodes between the node representing the start symbol and the superior hierarchical node, and if a character string is given when state transition has been made to the node representing the start symbol, the hierarchy retrieval automaton makes state transition to the series of nodes until a hit-missing character appears, the series of nodes representing the unique character string converted from the hierarchical name of the subordinate hierarchical node.

13. The computer-readable recording medium according to claim 1, wherein the single automaton makes state transition to a node corresponding to the head character in the keyword retrieval automaton, if the head character of the hit keyword is given when state transition has been made to the hit hierarchical node in the hierarchy retrieval automaton.

14. The computer-readable recording medium according to claim 1, wherein the single automaton makes state transition to the hit hierarchical node, if a hit-missing character is given when state transition has been made to any node in the keyword retrieval automaton.

15. The computer-readable recording medium according to claim 1 and storing therein the information retrieving program that causes the computer to further execute:
extracting from the path schema, a partial path schema related to a retrieval range specified by the input retrieval equation, wherein
the generating of the single automaton includes generating the single automaton that includes the hierarchy retrieval automaton that retrieves a hierarchy of the extracted partial path schema and the hit keyword retrieval automaton that retrieves the hit keyword.

16. The computer-readable recording medium according to claim 1 and storing therein the information retrieving program that causes the computer to further execute:
converting a start tag representing each hierarchy in the document into a start tag that includes a hierarchy start indicator and a unique identifier assigned to each path making up the path schema, the converting further including converting an end tag representing each hierarchy in the document into an end tag that includes a hierarchy end indicator and a unique identifier assigned to each path making up the path schema, wherein
the generating of the path schema includes generating the path schema related to the document converted at the converting.

17. The computer-readable recording medium according to claim 1 and storing therein the information retrieving program that causes the computer to further execute:

converting a start tag representing each hierarchy in the document into a start tag that includes a hierarchy start indicator and a unique identifier assigned to each path making up the path schema, the converting further including converting an end tag representing each hierarchy in the document into a start tag that includes the hierarchy start indicator and the unique identifier assigned to a path whose end is a parent node to a hierarchical node specified by the hierarchical name of a start tag corresponding to the hierarchy start indicator and the end tag, wherein the generating of the path schema includes generating the path schema related to the document converted at the converting.

18. An information retrieving apparatus comprising:

a computer including:

an acquiring unit that acquires a document to be searched and having a hierarchical structure;

a path schema generating unit that generates a path schema related to the acquired document;

an input unit that receives input of a retrieval keyword, a retrieval condition for the retrieval keyword, and a retrieval equation for the retrieval keyword;

an automaton generating unit that generates a single automaton that includes a hierarchy retrieval automaton that retrieves a hierarchy of the generated path schema and a hit keyword retrieval automaton that retrieves a hit keyword satisfying the input retrieval condition for the retrieval keyword, the single automaton making state transition between a hit hierarchical node at which the hit keyword in the hierarchy retrieval automaton is present and a set of nodes representing the hit keyword;

a retrieving unit that retrieves, from the document and using the generated single automaton, the hit keyword within the retrieval range; and an output unit that outputs a retrieval result of the retrieving unit.

19. An information retrieving method comprising:

acquiring a document to be searched and having a hierarchical structure;

generating a path schema related to the acquired document;

receiving input of a retrieval keyword, a retrieval condition for the retrieval keyword, and a retrieval equation for the retrieval keyword;

generating a single automaton that includes a hierarchy retrieval automaton that retrieves a hierarchy of the generated path schema and a hit keyword retrieval automaton that retrieves a hit keyword satisfying the input retrieval condition for the retrieval keyword, the single automaton making state transition between a hit hierarchical node at which the hit keyword in the hierarchy retrieval automaton is present and a set of nodes representing the hit keyword;

retrieving, from the document and using the generated single automaton, the hit keyword within the retrieval range; and outputting a retrieval result obtained at the retrieving.

* * * * *